United States Patent
Stone et al.

(10) Patent No.: US 9,741,072 B2
(45) Date of Patent: Aug. 22, 2017

(54) SYSTEMS AND METHODS FOR PROVIDING A CUSTOMIZABLE VIRTUAL GIFT CARD TEMPLATE

(71) Applicant: CashStar, Inc., Portland, ME (US)

(72) Inventors: David D. Stone, Falmouth, ME (US); Glenn Snyder, Sudbury, MA (US); Phelps Peeler, Portland, ME (US)

(73) Assignee: CashStar, Inc., Portland, ME (US)

(*) Notice: Subject to any disclaimer, the term of this patent is extended or adjusted under 35 U.S.C. 154(b) by 729 days.

(21) Appl. No.: 13/795,947

(22) Filed: Mar. 12, 2013

(65) Prior Publication Data

US 2013/0254064 A1    Sep. 26, 2013

Related U.S. Application Data

(62) Division of application No. 12/606,674, filed on Oct. 27, 2009, now Pat. No. 8,442,866.

(Continued)

(51) Int. Cl.
*G06Q 30/00* (2012.01)
*G06Q 30/06* (2012.01)
(Continued)

(52) U.S. Cl.
CPC ..... *G06Q 30/0641* (2013.01); *G06Q 30/0603* (2013.01); *G06Q 30/0621* (2013.01); *G06Q 40/02* (2013.01)

(58) Field of Classification Search
CPC ................................ G06C 30/06; G06C 30/08
(Continued)

(56) References Cited

U.S. PATENT DOCUMENTS 7,177,838 B1    2/2007 Ling
7,249,099 B2    7/2007 Ling
(Continued)

FOREIGN PATENT DOCUMENTS

KR    10-2001-0000053    1/2001
KR    10-2001-0100653    11/2001
(Continued)

OTHER PUBLICATIONS

Webcertificate(TM)—The Web's First Universally Accepted Gift Certificate, PR Newswire. New York: Nov. 16, 1998. p. 1, downloaded from ProQuestDirect on the Internet on May 6, 2012, 3 pages.

(Continued)

*Primary Examiner* — James Zurita
(74) *Attorney, Agent, or Firm* — Nixon Peabody LLP; Justin D. Swindells

(57) ABSTRACT

According to one aspect, embodiments of the invention provide a method for administering a virtual gift card, the method comprising acts of receiving a request from a server of a retailer, providing, in response to the request, an interface to a terminal operated by a purchaser, the interface comprising fields for receiving a value and a recipient for the virtual gift card, receiving from the terminal, in response to input from the purchaser, the value and the recipient for the virtual gift card, generating a code for the virtual gift card, and sending a message to the recipient of the virtual gift card, the message including the code for the virtual gift card.

15 Claims, 13 Drawing Sheets

Related U.S. Application Data

(60) Provisional application No. 61/108,822, filed on Oct. 27, 2008.

(51) Int. Cl.
*G06Q 40/02* (2012.01)
*G06Q 30/08* (2012.01)

(58) Field of Classification Search
USPC .............................................. 705/26.1, 27.1
See application file for complete search history.

(56) References Cited

U.S. PATENT DOCUMENTS

| | | |
|---|---|---|
| 7,328,189 B2 | 2/2008 | Ling |
| 7,376,621 B1 | 5/2008 | Ling |
| 7,711,620 B2 | 5/2010 | Abifaker |
| 7,953,654 B2 | 5/2011 | Abifaker |
| 7,992,774 B2 | 8/2011 | Lynch et al. |
| 8,200,544 B1 | 6/2012 | Jones et al. |
| 8,396,772 B2 | 3/2013 | Abifaker |
| 8,521,629 B2 | 8/2013 | Abifaker |
| 8,554,655 B2 | 10/2013 | Abifaker |
| 8,655,762 B2 | 2/2014 | Abifaker |
| 2004/0030598 A1 | 2/2004 | Boal |
| 2004/0099730 A1* | 5/2004 | Tuchler .............. G06K 17/0022 235/380 |
| 2005/0278188 A1 | 12/2005 | Thomson et al. |
| 2006/0100927 A1 | 5/2006 | Zormati |
| 2007/0063020 A1 | 3/2007 | Barrafato |
| 2007/0108268 A1 | 5/2007 | Graves et al. |
| 2008/0052164 A1 | 2/2008 | Abifaker |
| 2008/0283592 A1* | 11/2008 | Oder, II .................. G06Q 20/20 235/380 |
| 2009/0138396 A1 | 5/2009 | Boal |
| 2010/0010918 A1* | 1/2010 | Hunt .................... G06Q 20/102 705/26.1 |
| 2010/0041368 A1 | 2/2010 | Kumar |

FOREIGN PATENT DOCUMENTS

| | | |
|---|---|---|
| KR | 10-2002-0004010 | 1/2002 |
| WO | 2009/073451 | 6/2009 |

OTHER PUBLICATIONS

Won, Shirley, Got $100,000? Four Seasons has a gift card for you. The Globe and Mail [Toronto, Ont] Dec. 5, 2006: B.1, downloaded from ProQuestDirect on the Internet on Jan. 29, 2013.

International Search Report and Written Opinion from corresponding International Application No. PCT/US/201035764 dated Aug. 30, 2010.

* cited by examiner

Figure 5

SYSTEMS AND METHODS FOR PROVIDING A CUSTOMIZABLE VIRTUAL GIFT CARD TEMPLATE

CLAIM OF PRIORITY AND CROSS-REFERENCE TO RELATED APPLICATIONS

This application is a Divisional of U.S. patent application Ser. No. 12/606,674, which was filed on Oct. 27, 2009, and claims the benefit of and priority to U.S. Provisional Patent Application No. 61/108,822, which was filed on Oct. 27, 2008, both of which are incorporated herein by reference in their respective entireties.

APPLICABLE FIELD

The field of the present invention relates generally to systems and methods for implementing and managing virtual gift cards.

BACKGROUND

Some retailers have implemented gift card programs where a visitor to a retail establishment can purchase a card of a particular denomination. The card may then be given to a recipient, who can redeem the gift card retail establishment for the specified denomination. There are also computer-based systems that allow a visitor to a website to purchase a "virtual" gift card which can be distributed electronically to a recipient (e.g., via email or other distribution method).

SUMMARY

Described herein are systems and methods for implementing and managing virtual gift cards. Broadly speaking, a virtual gift card is an electronic implementation of a physical gift card that can be purchased in many retail establishments and redeemed by gift card recipients for the purchase of goods and/or services. The virtual gift card may be purchased and/or redeemed in physical storefronts, on-line (either at a retailer's website or a third-party website), in catalogs, by telephone, by mail, or in any other way that transactions for the sale of goods or services are carried out. The virtual gift card may be redeemable for goods or services such as retail goods, purchases in restaurants, travel services, hotel or other hospitality services, entertainment such as movie tickets, or any other goods or services. The term "retailer" is used herein to describe an entity that accepts payment for goods or services by virtual gift card, but it should be understood that the "retailer" in the following discussion can be any provider of goods or services including, but not limited to manufacturers or products, providers of services, resellers, advertisers, or other type of provider.

In accordance with one aspect of the present invention a method for administering a virtual gift card is provided. The method comprises acts of receiving a request from a server of a retailer, providing, in response to the request, an interface to a terminal operated by a purchaser, the interface comprising fields for receiving a value and a recipient for the virtual gift card, receiving from the terminal, in response to input from the purchaser, the value and the recipient for the virtual gift card, generating a code for the virtual gift card, and sending a message to the recipient of the virtual gift card, the message including the code for the virtual gift card.

In accordance with one embodiment, the method further comprises acts of receiving, from a terminal operated by the recipient, a message including the code for the virtual gift card and an amount of a purchase, and debiting, from an account associated with the recipient, the amount of the purchase. In accordance with another embodiment, the method further comprises act of receiving, from a terminal operated by the retailer, a message including the code for the virtual gift card and an amount of a purchase, and debiting, from an account associated with the recipient, the amount of the purchase.

In accordance with one embodiment, the method further comprises an act of receiving from the terminal, in response to input from the purchaser, information specifying at least one customizable design element, and wherein the message sent to the recipient of the virtual gift card includes the at least one customizable design element. In accordance with another embodiment, the interface includes a preview portion displaying the at least one customizable design element according to the information specifying the at least one customizable design element. In accordance with another embodiment the at least one customizable design element includes text. In accordance with another embodiment, the at least one customizable design element includes an image.

In accordance with one embodiment, the interface provided to the terminal operated by the purchaser further comprises a design element specific to the retailer. In accordance with another embodiment, the message sent to the recipient of the virtual gift card further comprises a design element specific to the retailer.

In accordance with another aspect of the present invention, a method for providing a virtual gift card is provided. The method comprises acts of receiving at least one code for at least one virtual gift card from a retailer, receiving a request from a server of the retailer, providing, in response to the request, an interface to a terminal operated by a purchaser, the interface comprising fields for receiving a value and a recipient for the virtual gift card, receiving from the terminal, in response to input from the purchaser, the value and the recipient for the virtual gift card, associating a code with the virtual gift card, and sending to the recipient of the virtual gift card a message including the code for the virtual gift card.

In accordance with one embodiment, the method further comprises an act of receiving from the terminal, in response to input from the purchaser, information specifying at least one customizable design element, and wherein the message sent to the recipient of the virtual gift card includes the at least one customizable design element. In accordance with another embodiment, the interface includes a preview portion displaying the at least one customizable design element according to the information specifying the at least one customizable design element. In accordance with another embodiment the at least one customizable design element includes text. In accordance with another embodiment the at least one customizable design element includes an image.

In accordance with one aspect of the present invention, a method for providing a virtual gift card template is provided. The method comprises acts of providing an interface to a terminal operated by a designer, the interface comprising a plurality of fields, each of the plurality of fields corresponding to a design element of the virtual gift card template, receiving from the terminal, in response to input from the designer, a value for each field of the plurality of fields, the value specifying the design element corresponding to the field, and providing, in response to receiving a request for a virtual gift card, a virtual gift card template having the specified design elements.

In accordance with one embodiment, the method further comprises an act of receiving from the terminal, in response to input from the user, information specifying at least one customizable design element, and wherein the virtual gift card template includes the at least one customizable design element. In accordance with another embodiment, the interface includes a preview portion displaying the at least one customizable design element according to the information specifying the at least one customizable design element. In accordance with another embodiment the at least one customizable design element includes text. In accordance with another embodiment, the at least one customizable design element includes an image.

In accordance with one embodiment, the interface provided to the terminal operated by the designer further comprises a design element specific to the retailer. In accordance with another embodiment, the virtual gift card template comprises a design element specific to the retailer.

In accordance with another aspect of the present invention, a method for administering a plurality of virtual gift cards is provided. The method comprises acts of receiving a request from a server of a retailer, providing, in response to the request, an interface to a terminal operated by a purchaser; the interface comprising fields for receiving at least one value and a plurality of recipients for the plurality of virtual gift cards, receiving from the terminal, in response to input from the purchaser, the at least one value and the plurality of recipients for the plurality of virtual gift cards, generating a plurality of codes, each code corresponding to one of the plurality of virtual gift cards, and sending a message to each of the plurality of recipients of the virtual gift cards, the message including one of the plurality of codes.

In accordance with one embodiment, the method further comprises acts of receiving, from a terminal operated by a one of the recipients, a message including the code sent to the recipient and an amount of a purchase, and debiting, from an account associated with the one of the recipient, the amount of the purchase. In accordance with another embodiment, the method further comprises acts of receiving, from a terminal operated by the retailer, a message including the code sent to one of the recipients and an amount of a purchase, and debiting, from an account associated with the one of the recipient, the amount of the purchase.

In accordance with one embodiment, the method further comprises an act of receiving from the terminal, in response to input from the purchaser, information specifying at least one customizable design element, and wherein the message sent to the recipient of the virtual gift card includes the at least one customizable design element. In accordance with another embodiment, the interface includes a preview portion displaying the at least one customizable design element according to the information specifying the at least one customizable design element. In accordance with another embodiment the at least one customizable design element includes text. In accordance with another embodiment, the at least one customizable design element includes an image.

In accordance with one embodiment, the interface provided to the terminal operated by the purchaser further comprises a design element specific to the retailer. In accordance with another embodiment the message sent to the recipient of the virtual gift card further comprises a design element specific to the retailer.

In accordance with one aspect of the present invention, a method for providing a plurality of virtual gift cards is provided. The method comprises acts of receiving a plurality of codes for the plurality of virtual gift cards from a retailer, receiving a request from a server of the retailer, providing, in response to the request, an interface to a terminal operated by a purchaser, the interface comprising fields for receiving at least one value and a plurality of recipients for the plurality of virtual gift cards, receiving from the terminal, in response to input from the purchaser, the at least one value and the plurality of recipients for the plurality of virtual gift cards, associating one of the plurality of codes with one of the plurality of virtual gift cards, and sending to each of the plurality of recipients, a message including one of the plurality of codes.

In accordance with one embodiment, the method further comprises an act of receiving from the terminal, in response to input from the purchaser, information specifying at least one customizable design element, and wherein the message sent to a recipient of a virtual gift card includes the at least one customizable design element. In accordance with another embodiment, the interface includes a preview portion displaying the at least one customizable design element according to the information specifying the at least one customizable design element. In accordance with another embodiment, the at least one customizable design element includes text. In accordance with another embodiment, the at least one customizable design element includes an image.

In accordance with one embodiment, the interface provided to the terminal operated by the purchaser further comprises a design element specific to the retailer. In accordance with another embodiment, the message sent to the recipient of the virtual gift card further comprises a design element specific to the retailer.

In accordance with another aspect of the present invention, a computer readable medium having computer-readable instructions stored thereon that define instructions that, as a result of being executed by a computer, instruct the computer to perform a method for administering a virtual gift card is provided. The method comprises acts of receiving a request from a server of a retailer, providing, in response to the request, an interface to a terminal operated by a purchaser, the interface comprising fields for receiving a value and a recipient for the virtual gift card, receiving from the terminal, in response to input from the purchaser; the value and the recipient for the virtual gift card, generating a code for the virtual gift card, and sending a message to the recipient of the virtual gift card, the message including the code for the virtual gift card.

In accordance with one embodiment, the method further comprises acts of receiving, from a terminal operated by the recipient, a message including the code for the virtual gift card and an amount of a purchase, and debiting, from an account associated with the recipient, the amount of the purchase. In accordance with another embodiment, the method further comprises act of receiving, from a terminal operated by the retailer, a message including the code for the virtual gift card and an amount of a purchase, and debiting, from an account associated with the recipient, the amount of the purchase.

In accordance with one embodiment, the method further comprises an act of receiving from the terminal, in response to input from the purchaser, information specifying at least one customizable design element, and wherein the message sent to the recipient of the virtual gift card includes the at least one customizable design element. In accordance with another embodiment, the interface includes a preview portion displaying the at least one customizable design element according to the information specifying the at least one customizable design element. In accordance with another embodiment the at least one customizable design element includes text. In accordance with another embodiment, the at least one customizable design element includes an image.

In accordance with one embodiment, the interface provided to the terminal operated by the purchaser further comprises a design element specific to the retailer. In accordance with another embodiment, the message sent to the recipient of the virtual gift card further comprises a design element specific to the retailer.

In accordance with another aspect of the present invention, a computer readable medium having computer-readable instructions stored thereon that define instructions that, as a result of being executed by a computer, instruct the computer to perform a method for administering a virtual gift card is provided. The method comprises acts of receiving at least one code for at least one virtual gift card from a retailer, receiving a request from a server of the retailer, providing, in response to the request, an interface to a terminal operated by a purchaser, the interface comprising fields for receiving a value and a recipient for the virtual gift card, receiving from the terminal, in response to input from the purchaser, the value and the recipient for the virtual gift card, associating a code with the virtual gift card, and sending to the recipient of the virtual gift card a message including the code for the virtual gift card.

In accordance with one embodiment, the method further comprises an act of receiving from the terminal, in response to input from the purchaser, information specifying at least one customizable design element, and wherein the message sent to the recipient of the virtual gift card includes the at least one customizable design element. In accordance with another embodiment, the interface includes a preview portion displaying the at least one customizable design element according to the information specifying the at least one customizable design element. In accordance with another embodiment the at least one customizable design element includes text. In accordance with another embodiment the at least one customizable design element includes an image.

In accordance with one embodiment, the interface provided to the terminal operated by the purchaser further comprises a design element specific to the retailer. In accordance with another embodiment, the message sent to the recipient of the virtual gift card further comprises a design element specific to the retailer.

In accordance with one aspect of the present invention, a computer readable medium having computer-readable instructions stored thereon that define instruction that, as a result of being executed by a computer, instruct the computer to perform a method for administering a virtual gift card is provided. The method comprises acts of providing an interface to a terminal operated by a designer, the interface comprising a plurality of fields, each of the plurality of fields corresponding to a design element of the virtual gift card template, receiving from the terminal, in response to input from the designer, a value for each field of the plurality of fields, the value specifying the design element corresponding to the field, and providing, in response to receiving a request for a virtual gift card, a virtual gift card template having the specified design elements.

In accordance with one embodiment, the method further comprises an act of receiving from the terminal, in response to input from the user, information specifying at least one customizable design element, and wherein the virtual gift card template includes the at least one customizable design element. In accordance with another embodiment, the interface includes a preview portion displaying the at least one customizable design element according to the information specifying the at least one customizable design element. In accordance with another embodiment the at least one customizable design element includes text. In accordance with another embodiment, the at least one customizable design element includes an image.

In accordance with one embodiment, the interface provided to the terminal operated by the designer further comprises a design element specific to the retailer. In accordance with another embodiment, the virtual gift card template comprises a design element specific to the retailer.

In accordance with another aspect of the present invention, a computer readable medium having computer-readable instructions stored thereon that define instructions that, as a result of being executed by a computer, instruct the computer to perform a method for administering a plurality of virtual gift cards is provided. The method comprises acts of receiving a request from a server of a retailer, providing, in response to the request, an interface to a terminal operated by a purchaser; the interface comprising fields for receiving at least one value and a plurality of recipients for the plurality of virtual gift cards, receiving from the terminal, in response to input from the purchaser, the at least one value and the plurality of recipients for the plurality of virtual gift cards, generating a plurality of codes, each code corresponding to one of the plurality of virtual gift cards, and sending a message to each of the plurality of recipients of the virtual gift cards, the message including one of the plurality of codes.

In accordance with one embodiment, the method further comprises acts of receiving, from a terminal operated by a one of the recipients, a message including the code sent to the recipient and an amount of a purchase, and debiting, from an account associated with the one of the recipient, the amount of the purchase. In accordance with another embodiment, the method further comprises acts of receiving, from a terminal operated by the retailer, a message including the code sent to one of the recipients and an amount of a purchase, and debiting, from an account associated with the one of the recipient, the amount of the purchase.

In accordance with one embodiment, the method further comprises an act of receiving from the terminal, in response to input from the purchaser, information specifying at least one customizable design element, and wherein the message sent to the recipient of the virtual gift card includes the at least one customizable design element. In accordance with another embodiment, the interface includes a preview portion displaying the at least one customizable design element according to the information specifying the at least one customizable design element. In accordance with another embodiment the at least one customizable design element includes text. In accordance with another embodiment, the at least one customizable design element includes an image.

In accordance with one embodiment, the interface provided to the terminal operated by the purchaser further comprises a design element specific to the retailer. In accordance with another embodiment the message sent to the recipient of the virtual gift card further comprises a design element specific to the retailer.

In accordance with one aspect of the present invention, a computer readable medium having computer-readable instructions stored thereon that define instructions that, as a result of being executed by a computer, instruct the computer to perform a method for administering a plurality of virtual gift cards is provided. The method comprises acts of receiving a plurality of codes for the plurality of virtual gift cards from a retailer, receiving a request from a server of the retailer, providing, in response to the request, an interface to a terminal operated by a purchaser, the interface comprising fields for receiving at least one value and a plurality of recipients for the plurality of virtual gift cards, receiving from the terminal, in response to input from the purchaser, the at least one value and the plurality of recipients for the plurality of virtual gift cards, associating one of the plurality of codes with one of the plurality of virtual gift cards, and sending to each of the plurality of recipients, a message including one of the plurality of codes.

In accordance with one embodiment, the method further comprises an act of receiving from the terminal, in response to input from the purchaser, information specifying at least one customizable design element, and wherein the message sent to a recipient of a virtual gift card includes the at least one customizable design element. In accordance with another embodiment, the interface includes a preview portion displaying the at least one customizable design element according to the information specifying the at least one customizable design element. In accordance with another embodiment, the at least one customizable design element includes text. In accordance with another embodiment, the at least one customizable design element includes an image.

In accordance with one embodiment, the interface provided to the terminal operated by the purchaser further comprises a design element specific to the retailer. In accordance with another embodiment, the message sent to the recipient of the virtual gift card further comprises a design element specific to the retailer.

In accordance with another aspect of the present invention, a system for administering a virtual gift card is provided. The system comprises a component configured to receive a request from a server of a retailer, a component configured to provide, in response to the request, an interface to a terminal operated by a purchaser, the interface comprising fields for receiving a value and a recipient for the virtual gift card, a component configured to receive from the terminal, in response to input from the purchaser, the value and the recipient for the virtual gift card, a component configured to generate a code for the virtual gift card, and a component configured to send a message to the recipient of the virtual gift card, the message including the code for the virtual gift card.

In accordance with one embodiment, the system further comprises a component configured to receive, from a terminal operated by the recipient, a message including the code for the virtual gift card and an amount of a purchase, and a component configured to debit, from an account associated with the recipient, the amount of the purchase. In accordance with another embodiment, the system further comprises a component configured to receive, from a terminal operated by the retailer, a message including the code for the virtual gift card and an amount of a purchase, and a component configured to debit, from an account associated with the recipient, the amount of the purchase.

In accordance with one embodiment, the system further comprises a component configured to receive from the terminal, in response to input from the purchaser, information specifying at least one customizable design element, and wherein the message sent to the recipient of the virtual gift card includes the at least one customizable design element. In accordance with another embodiment, the interface includes a preview portion displaying the at least one customizable design element according to the information specifying the at least one customizable design element. In accordance with another embodiment, the at least one customizable design element includes text. In accordance with another embodiment, the at least one customizable design element includes an image.

In accordance with one embodiment, the interface provided to the terminal operated by the purchaser further comprises a design element specific to the retailer. In accordance with another embodiment, the message sent to the recipient of the virtual gift card further comprises a design element specific to the retailer.

In accordance with another aspect of the present invention, a system for providing a virtual gift card is provided. The system comprises a component configured to receive at least one code for at least one virtual gift card from a retailer, a component configured to receive a request from a server of the retailer, a component configured to provide, in response to the request, an interface to a terminal operated by a purchaser; the interface comprising fields for receiving a value and a recipient for the virtual gift card, a component configured to receive from the terminal, in response to input from the purchaser, the value and the recipient for the virtual gift card, a component configured to associate a code with the virtual gift card, and a component configured to send to the recipient of the virtual gift card a message including the code for the virtual gift card.

In accordance with one embodiment, the system further comprises a component configured to receive from the terminal, in response to input from the purchaser, information specifying at least one customizable design element, and wherein the message sent to the recipient of the virtual gift card includes a least one customizable design element. In accordance with another embodiment, the interface includes a preview portion displaying the at least one customizable design element according to the information specifying the at least one customizable design element. In accordance with another embodiment, the at least one customizable design element includes text. In accordance with another embodiment, the at least one customizable design element includes an image.

In accordance with one embodiment, the interface provided to the terminal operated by the purchaser further comprises a design element specific to the retailer. In accordance with another embodiment, the message sent to the recipient of the virtual gift card further comprises a design element specific to the retailer.

In accordance with one aspect of the present invention, a system for providing a virtual gift card template is provided. The system comprises a component configured to provide an interface to a terminal operated by a designer, the interface comprising a plurality of fields, each of the plurality of fields corresponding to a design element of the virtual gift card template, a component configured to receive from the terminal, in response to input from the designer, a value for each field of the plurality of fields, the value specifying the design element corresponding to the field, and a component configured to provide, in response to receiving a request for a virtual gift card, a virtual gift card template having the specified design elements.

In accordance with one embodiment, the system further comprises a component configured to receive from the terminal, in response to input from the user, information specifying at least one customizable design element, and wherein the virtual gift card template includes the at least one customizable design element. In accordance with another embodiment, the interface includes a preview portion displaying the at least one customizable design element according to the information specifying the at least one customizable design element. In accordance with another embodiment, the at least one customizable design element includes text. In accordance with another embodiment, the at least one customizable design element includes an image.

In accordance with one embodiment, the interface provided to the terminal operated by the designer further comprises a design element specific to the retailer. In accordance with another embodiment, the virtual gift card template comprises a design element specific to the retailer.

In accordance with another aspect of the present invention, a system for administering a plurality of virtual gift cards is provided. The system comprises a component configured to receive a request from a server of a retailer, a component configured to provide, in response to the request, an interface to a terminal operated by a purchaser; the interface comprising fields for receiving at least one value and a plurality of recipients for the plurality of virtual gift cards, a component configured to receive from the terminal, in response to input from the purchaser, the at least one value and the plurality of recipients for the plurality of virtual gift cards, a component configured to generate a plurality of codes, each code corresponding to one of the plurality of virtual gift cards, and a component configured to send a message to each of the plurality of recipients of the virtual gift cards, the message including one of the plurality of codes.

In accordance with one embodiment, the system further comprises a component configured to receive, from a terminal operated by a one of the recipients, a message including the code sent to the recipient and an amount of a purchase, and a component configured to debit, from an account associated with the one of the recipient, the amount of the purchase. In accordance with another embodiment, the system further comprises a component configured to receive, from a terminal operated by the retailer, a message including the code sent to one of the recipients and an amount of a purchase, and a component configured to debit, from an account associated with the one of the recipient, the amount of the purchase.

In accordance with one embodiment, the system further comprises a component configured to receive from the terminal, in response to input from the purchaser, information specifying at least one customizable design element, and wherein the message sent to the recipient of the virtual gift card includes the at least one customizable design element. In accordance with another embodiment, the interface includes a preview portion displaying the at least one customizable design element according to the information specifying the at least one customizable design element. In accordance with another embodiment, the at least one customizable design element includes text. In accordance with another embodiment, the at least one customizable design element includes an image.

In accordance with one embodiment, the interface provided to the terminal operated by the purchaser further comprises a design element specific to the retailer. In accordance with another embodiment, the message sent to the recipient of the virtual gift card further comprises a Design element specific to the retailer.

In accordance with another aspect of the present invention, a system for providing a plurality of virtual gift cards is provided. The system comprises a component configured to receive a plurality of codes for the plurality of virtual gift cards from a retailer, a component configured to receive a request from a server of the retailer, a component configured to provide, in response to the request, an interface to a terminal operated by a purchaser; the interface comprising fields for receiving at least one value and a plurality of recipients for the plurality of virtual gift cards, a component configured to receive from the terminal, in response to input from the purchaser, the at least one value and the plurality of recipients for the plurality of virtual gift cards, a component configured to associate one of the plurality of codes to each one of the plurality of virtual gift cards, and a component configured to send to each of the plurality of recipients, a message including one of the plurality of codes.

In accordance with one embodiment, the system further comprises a component configured to receive from the terminal, in response to input from the purchaser, information specifying at least one customizable design element, and wherein the message sent to a recipient of a virtual gift card includes the at least one customizable design element. In accordance with another embodiment, the interface includes a preview portion displaying the at least one customizable design element according to the information specifying the at least one customizable design element; In accordance with another embodiment, the at least one customizable design element includes text. In accordance with another embodiment, the at least one customizable design element includes an image.

In accordance with one embodiment, the interface provided to the terminal operated by the purchaser further comprises a design element specific to the retailer. In accordance with another embodiment, the message sent to the recipient of the virtual gift card further comprises a design element specific to the retailer.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 illustrates a virtual gift card notice of a virtual gift card interface in accordance with one embodiment of the present invention.

DETAILED DESCRIPTION

Figure 1:
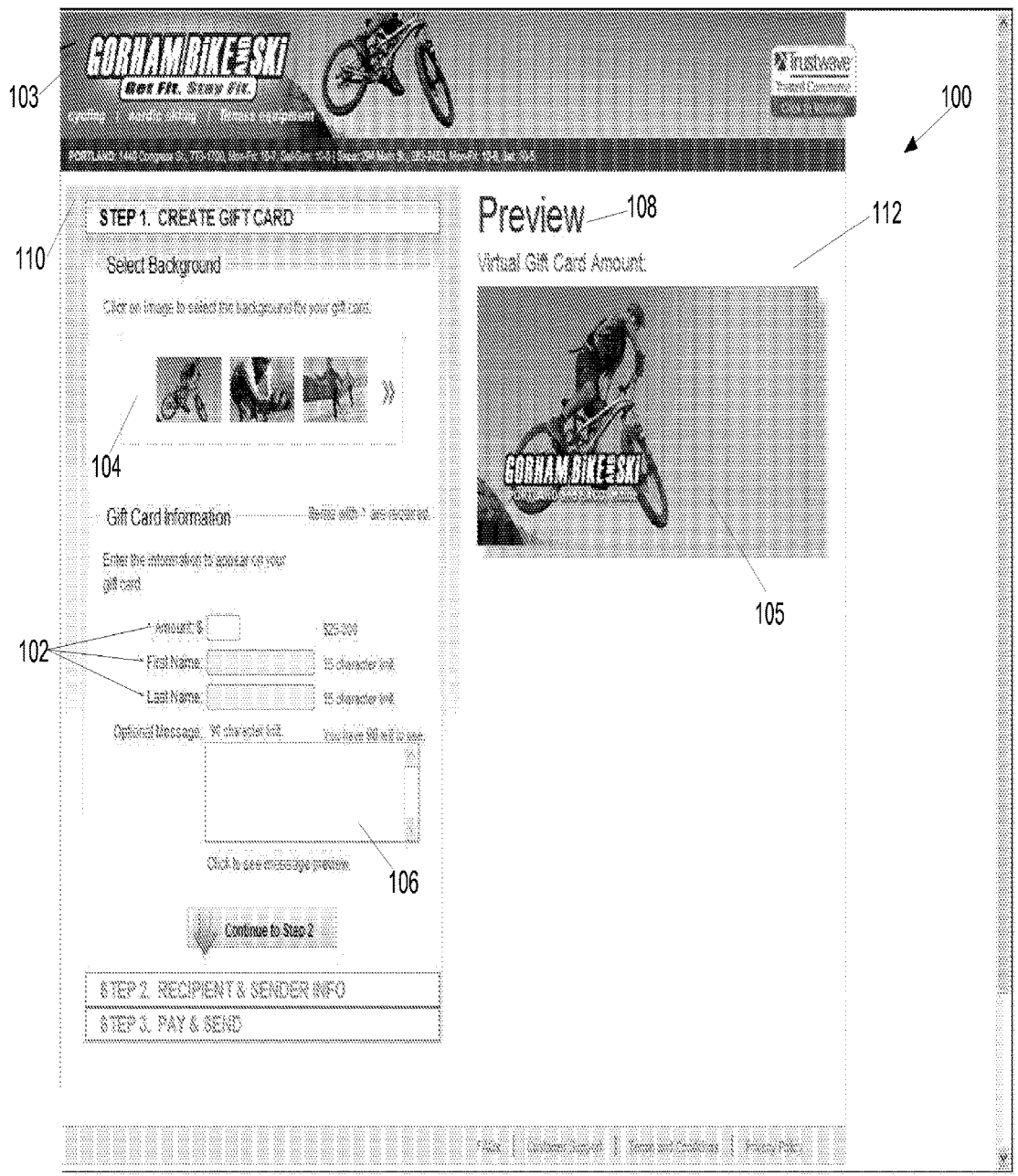
FIG. 1 illustrates an example virtual gift card interface in accordance with one embodiment of the present invention.

The aspects disclosed herein, which are in accord with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with anyone or more embodiments are not intended to be excluded from a similar role in any other embodiments.

For example, according to various embodiments of the present invention, a computer system is configured to perform any of the functions described herein, including but not limited to, providing an interface. However, such a system may also perform other functions. Moreover, the systems described herein may be configured to include or exclude any of the functions discussed herein. Thus the invention is not limited to a specific function or set of functions. Also the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Embodiments of the systems and methods described herein provide a system that permits a retailer to rely on a third-party service for providing virtual gift cards while preserving its own branding in the design elements included in the interface provided to virtual gift card purchasers and recipients and in the virtual gift card itself. Instead of having to develop its own in-house system for administering the sale and redemption of gift cards, a retailer can engage a third party virtual gift card provider to provide administration and development according to the methods and systems described herein, and obtain a set of tools for customizing virtual gift cards according to the retailer's branding and design requirements. Embodiments of the systems and methods described herein also allow purchasers to customize aspects of the virtual gift card, which may increase customer engagement resulting in more sales to the retailer. Moreover, in embodiments in which the virtual gift card interface includes branding and/or other design elements specific to the retailer, the experience of purchasing or redeeming a virtual gift card can be essentially transparent to the user. For example, instead of being redirected to an obvious third-party website, the user may be redirected to a gift card provider's website using the design elements of the familiar, trusted retailer, which can increase customer trust and Willingness to purchase virtual gift cards.

According to embodiments of the systems and methods described herein, a virtual gift card purchaser may buy a virtual gift card for a recipient. In some embodiments, the virtual gift card may be accepted for purchases by a particular retailer or group of retailers. An account (i.e., a database entry) may be created corresponding to the recipient's virtual gift card and credited with the virtual gift card amount selected and paid for by the purchaser. The recipient receives, for example in email or in a web browser, a notification of the virtual gift card. The notification may include a virtual gift card code uniquely correlated to the recipient's virtual gift card. The recipient may then make purchases on-line using the code, and the amount of such purchases will be debited from the recipient's virtual gift card. Alternatively, the recipient may print out an email or a web-page including the virtual gift card code or an encoded representation of the code (such as a bar code) and bring the printout to a physical storefront of a retailer accepting the virtual gift card. At the physical storefront the code may be keyed or scanned into a computer which requests a debit from the recipient's virtual gift card of the amount of purchase. Other aspects and features will be described below.

In embodiments of the systems and methods described herein, a system for providing or administering virtual gift cards may be a hosted service offering which allows a retailer (or other merchant or business) to offer its customers the opportunity to purchase virtual gift cards via its own website or via a third party website. In one embodiment, a system for providing or administering virtual gift cards can be constructed according to a processor model or according to a distributor model.

According to one embodiment, in the processor model the provider of the virtual gift card platform may generate codes that are used to identify virtual gift cards. Additionally, in the processor model the provider of the virtual gift card platform may maintain a database of virtual gift cards. Where the provider maintains such a database, purchases made with the virtual gift card may be directed to the database so that information, such as the remaining balance on the virtual gift card, may be kept up-to-date as purchases are made.

According to another embodiment, in the distributor model the provider of the virtual gift card platform may, instead of generating virtual gift card codes, receive virtual gift card codes from a retailer (or from a third-party generating codes on behalf of a retailer), either in blocks or individually when needed. Additionally, in the distributor model the retailer may maintain its own database of virtual gift cards. In the distributor model, the provider of the virtual gift card platform may not need to be kept apprised of purchases by the virtual gift card recipient.

Processor Model

As noted above, in the processor model the provider of a virtual gift card platform may provide the virtual gift card codes and maintain the database of recipient accounts.

According to one embodiment of the processor model, a purchaser wishing to order a virtual gift card may be redirected to a website of the provider of a virtual gift card platform from a website of the retailer at whose websites and/or stores the virtual gift card is redeemable. For example, a purchaser may click on an area of the retailer's website marked "get a virtual gift card" or similar and be redirected to a website of the provider.

As seen in FIG. 1, the website of the provider may include an interface 100 having fields 102 into which the purchaser can enter information pertaining to the virtual gift card and to the recipient. In one embodiment, the interface 100 is customized with design elements 103 particular to the retailer such as the retailer's logo or other design elements. Advantages of this feature include branding for the retailer and transparency for the purchaser. The retailer can rely on the gift card provider to handle providing the virtual gift cards while maintaining its brand presence to the purchaser throughout the process. The purchaser may also retain the experience of shopping with a trusted retailer instead of being obviously redirected to a third-party website.

The fields 102 in the user interface 100 may collect information from the purchaser such as a dollar amount of the virtual gift card and the name and/or email address of the recipient. The interface 100 may provide the opportunity to select a background image 105 for the virtual gift card. The background image may, in one embodiment, be selected from a predetermined set of images 104 presented to the purchaser, for example, images provided by the retailer when configuring the virtual gift card interface 100. The interface 100 may, in one embodiment, provide the purchaser the opportunity to upload his or her own image for use as the background, in addition to or instead of providing predetermined image choices. The interface 100 may provide the purchaser the opportunity to select from a number of predetermined messages (not shown, such as "Happy Birthday!" or "Congratulations!") The interface 100 also provide the purchaser with a text field 106 for optionally entering a personalized message for the recipient. For example, the interface 100 may provide a text box 106 into which the purchaser may type any desired text. The purchaser's text will be displayed on the virtual gift card sent to the recipient. In one embodiment, there may be an upper limit on the number of characters (e.g., 90 characters) and/or the number of lines of text in the customized personal message. The upper limit may be desirable for practicality of implementation as well as to preserve design aspects of the virtual gift card.

According to one embodiment, the interface 100 may show a preview 108 of the completed virtual gift card with purchaser-selected or purchaser-created elements in place. As discussed, in one embodiment the interface 100 may give the purchaser the opportunity to select other design elements of the virtual gift card, such as a picture background (either selected from a predetermined set or uploaded by the purchaser), text color, or other design elements. These design elements may also be displayed in the preview 108 of the completed virtual gift card. The preview may be displayed in real-time, or upon input from the purchaser. In one embodiment the interface includes a two-pane presentation in which one pane 110 includes fields for the purchaser to enter information and/or select design elements, and the other pane 112 includes a display area for displaying a preview of the virtual gift card. This gives the purchaser the opportunity to readily visualize the virtual gift card prior to purchase.

For example, as discussed above, according to one embodiment, the interface 100 provides for the purchaser to enter a personalized message of up to some predetermined number of characters. In one embodiment, the personal message can be previewed on the virtual gift card as it is being written. In another embodiment, the virtual gift card template may be specifically designed so that the personal message text can be displayed in a manner that does not conflict with the other design elements. The preview feature may permit the purchaser to verify that the personal message text does not overlap or otherwise conflict with other design elements in the virtual gift card.

Figure 2:
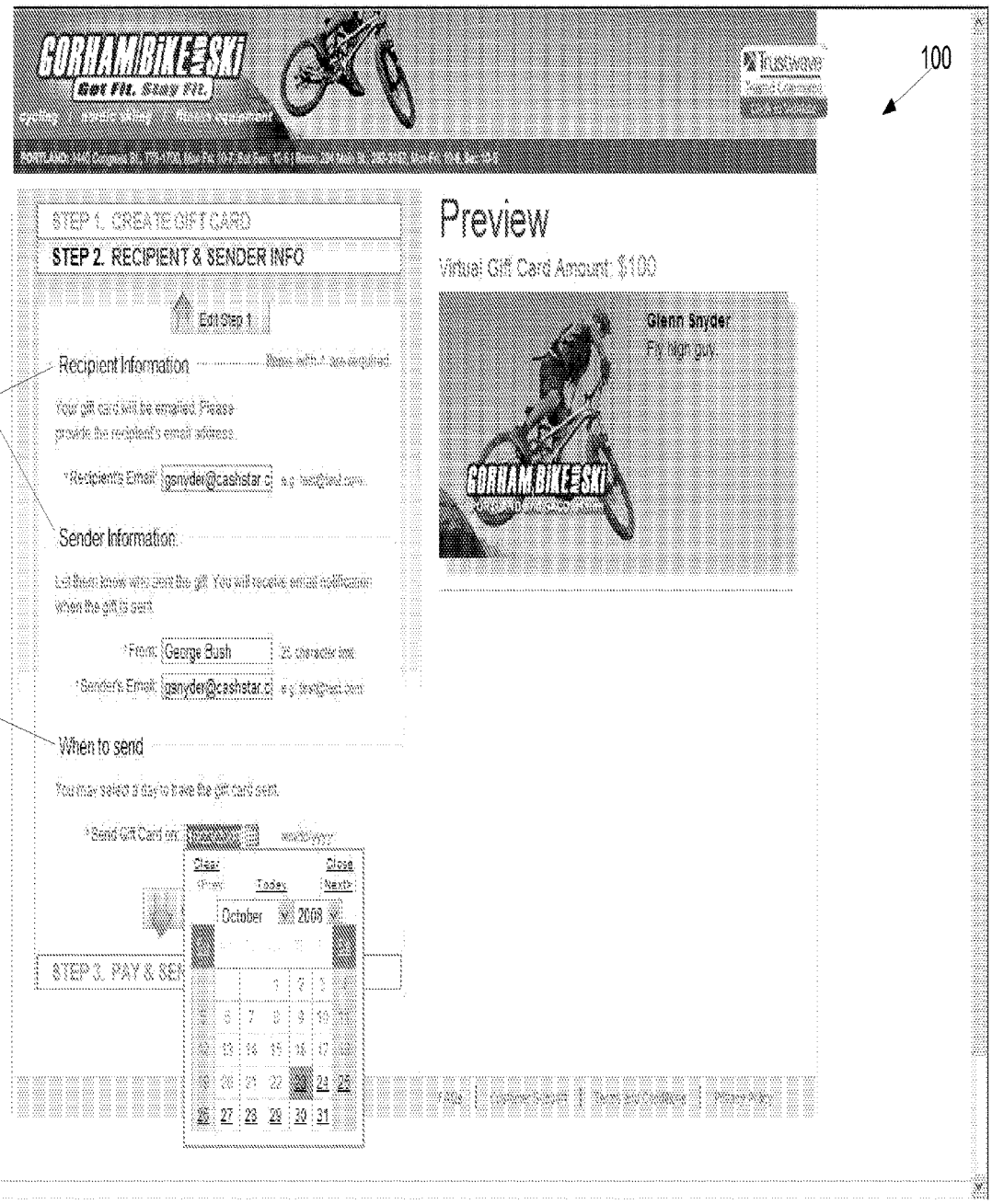
FIG. 2 illustrates another example of a virtual gift card interface in accordance with one embodiment of the present invention.

The interface 100 is further described with reference to FIG. 2. According to one embodiment, the interface 100 may provide the purchaser an option 114 for delivery of the virtual gift card immediately upon purchase or at a later date selected or otherwise entered by the purchaser into a delivery date field of the interface. The interface 100 may also include fields 116 for entering information about the purchaser and/or recipient, such as the purchaser's name and/or email address and the recipient's email.

Figure 3:
FIG. 3 illustrates a payment information segment of a virtual gift card interface in accordance with one embodiment of the present invention.
Figure 4:
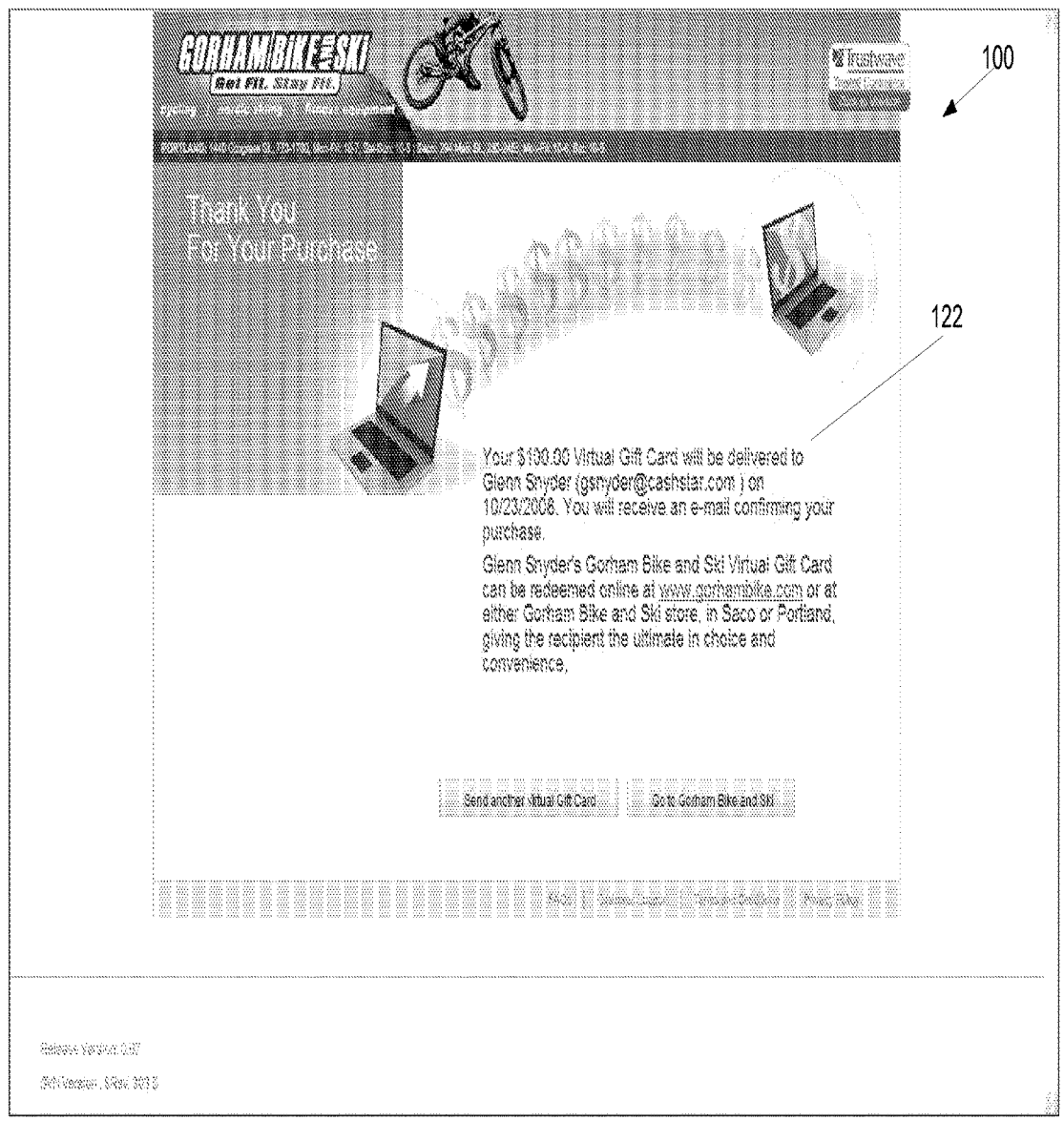
FIG. 4 illustrates a confirmation message of a virtual gift card interface in accordance with one embodiment of the present invention.

The interface 100 is further described with reference to FIG. 3. According to one embodiment, once all of the elements of the virtual gift card have been selected and/or entered, the interface 100 provides to the purchaser fields 118 for entering payment information, such as credit card information, and fields 120 for entering shipment information. The system may charge the purchaser for the amount of the virtual gift card and, in one embodiment, may also include a fee or service charge. When payment has been approved, the system may send a confirmation message to the purchaser, for example as a webpage, an email message, or both. One example of a confirmation message 122 can be seen in the interface 100 of FIG. 4. According to one embodiment, the confirmation message 122 may include such information as the recipients name, the recipients email address, the date of delivery, the amount of the gift card and/or the means by which the gift card can be redeemed.

According to one embodiment, the system also generates a virtual gift card code that can be uniquely associated with the virtual gift card being created. The virtual gift code may be generated at any point in the process of creating the virtual gift card and associated with the recipient at any point in the process of creating the virtual gift card. In one embodiment, virtual gift card codes are generated and stored for retrieval and assignment to a particular recipient virtual gift card during the process of creating a virtual gift card. In other embodiments, a virtual gift card code may be generated upon entry of the recipient's name, upon approval of the purchaser's payment for the virtual gift card, or at any other time during the process of generating a virtual gift card.

According to one embodiment, virtual gift card codes may be generated as follows. Code generation may begin with a sequence number beginning, for example, at 1, and incremented each time a code is generated, up to a maximum sequence number (i.e., 1 billion). The sequence number is multiplied by a large prime number. A unique and difficult-to-predict integer is obtained by taking the remainder of this product modulo the maximum sequence number. This approach provides unique numbering (up to the maximum sequence number), without any externally obvious pattern. In some embodiments, the unique number may have prepended to it the provider's BIN (bank identifier number) or IIN (issuer identifier number). The resulting code may also have an additional digit appended to make the full number valid according to a checksum such as the Luhn algorithm. This final Luhn-compliant number is one embodiment of a code that may be used as a unique virtual gift card code, and assigned by the system to a recipient's virtual gift card. It should be understood that many other approaches to generating and/or validating a unique code for use as a virtual gift card code may be taken. Any other procedure for generating such a code may be used with the systems and methods described in this application.

Figure 5:
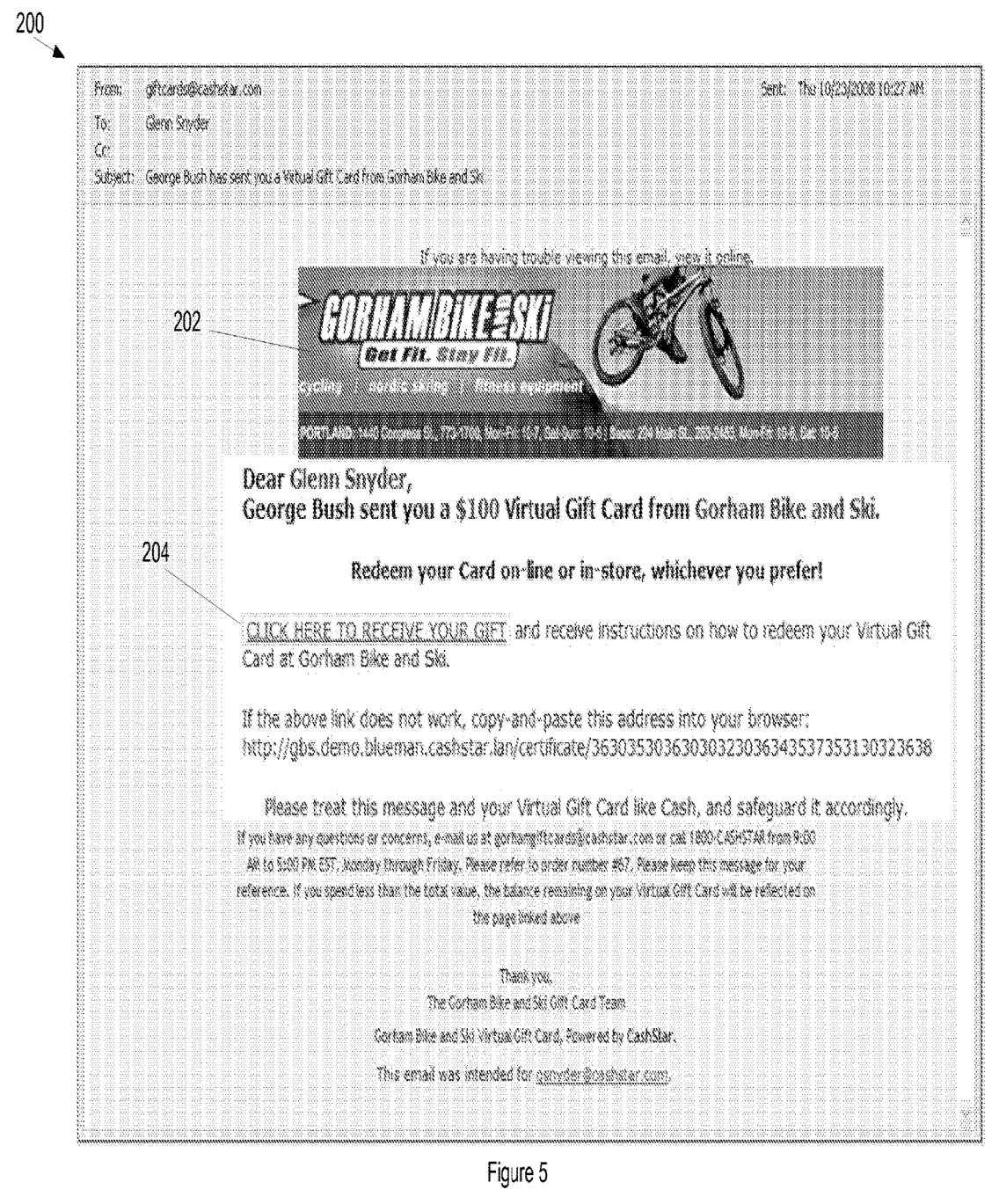

In one embodiment, once the payment has been approved, a message may be provided to the recipient notifying the recipient that a gift card has been purchased for him or her. Where the purchaser has selected the option of delivering the gift card at a later date, notice to the recipient may be deferred until that date. The notice to the recipient may be, for example as shown in FIG. 5, an email message 200 identifying the retailer, the purchaser, information on how to redeem the gift card and/or the amount of the gift card. Similar to the interface 100 provided to the purchaser, the email message 200 may include design elements 202 consistent with the retailer's branding, such as a logo or other images, particular colors and/or typefaces associated with the retailer's trade dress, or any other design element desired by the retailer.

According to one embodiment, the recipient is provided with the virtual gift card code which, as noted above, was generated and/or assigned to the recipient's virtual gift card at some prior point. The virtual gift card code (not shown) may be provided in the email message 200 to the recipient, either directly or encrypted. In some embodiments the code may be provided alphanumerically, or in others encoded form such as a 1D or 2D bar code, or in both forms.

Figure 6:
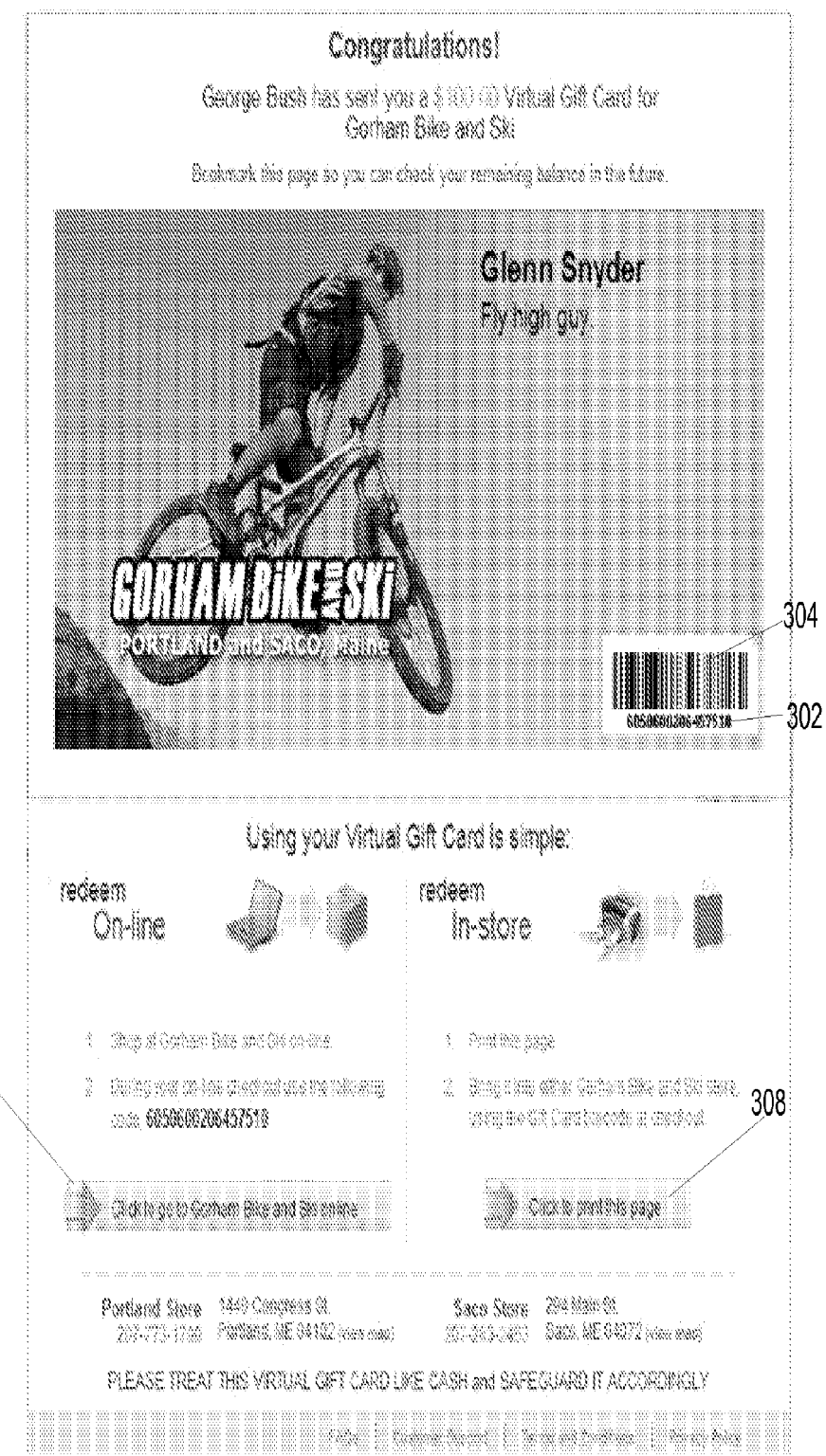
FIG. 6 illustrates a virtual gift card webpage in accordance with one embodiment of the present invention.

In a further embodiment, the email message 200 to the recipient may include a link 204 that the recipient may click on to view a webpage provided by the virtual gift card provider. One embodiment of the webpage 300 can be seen in FIG. 6. The web page 300 likewise may include a display of the recipient's virtual gift card code, either alphanumerically 302 or in an encoded form such as a 1D- or 2D-bar code 304, or in both forms. The webpage 300 provided to the recipient may include design elements consistent with the retailer's branding, such as a logo or other images, particular colors and/or typefaces associated with the retailer's trade dress, or any other design element desired by the retailer.

After receiving the email message 200 containing the virtual gift card and/or viewing the webpage 300 containing the virtual gift card, the recipient may choose to redeem the virtual gift card either in the retailer's on-line store 306 or at the retailer's physical store locations 308. According to one embodiment, the email 200 and/or the webpage 300 provided to the recipient may include a link 306 to the retailer's on-line store, where the recipient can enter the virtual gift-card code to use the virtual gift card toward a purchase. According to another embodiment, the email 200 and/or the webpage 300 provided to the recipient may include a link 308 to print out the email 200 and/or the webpage 300. To use the virtual gift card in a physical store location, the recipient may print out the email 200 and/or the webpage 300 and bring the printout to the physical store, where the recipient's virtual gift card code may be keyed (or, in embodiments in which the email or webpage includes a barcode, scanned) or otherwise entered into a computer which requests a debit from the recipient's virtual gift card of the amount of purchase.

As discussed above, according to one embodiment, in the processor model the database of virtual gift cards (and associated codes and values) is maintained by the virtual gift card provider. Thus, whether the virtual gift card is redeemed via on-line purchase or via in-store purchase, the retailer's computer communicates the purchase amount to the virtual gift card provider to update the database. It also is to be appreciated that any aspect of the transaction may be handled by the provider's servers.

According to some embodiments, the recipient of the gift card need not redeem the full value of the virtual gift card in a single purchase. Unused value is stored in the database at the provider's server, and the recipient can view the status of his or her virtual gift card by logging into a management system operated by the virtual gift card provider. In one embodiment, the recipient's virtual gift card is updated dynamically as purchases are made, and the recipient can access the database and dynamically view the current balance by accessing a web page provided by the virtual gift card provider. For example, in one embodiments the recipient can visit the webpage 300 linked in the email 200 received by the recipient. The link in that email may reference a dynamically-generated page containing information about the recipient's virtual gift card. For example, the link may include a field that is based upon the recipient's virtual gift card code, and pass that field to an application on the provider's server that dynamically generates a web page based upon the current status of the recipient's virtual gift card. If desired, the recipient can make additional purchases at a later date either using the virtual gift card code for an on line purchase, using the original printout with the code or bar code, or by creating a new virtual gift card printout reflecting the new balance at a future date.

Figure 7:
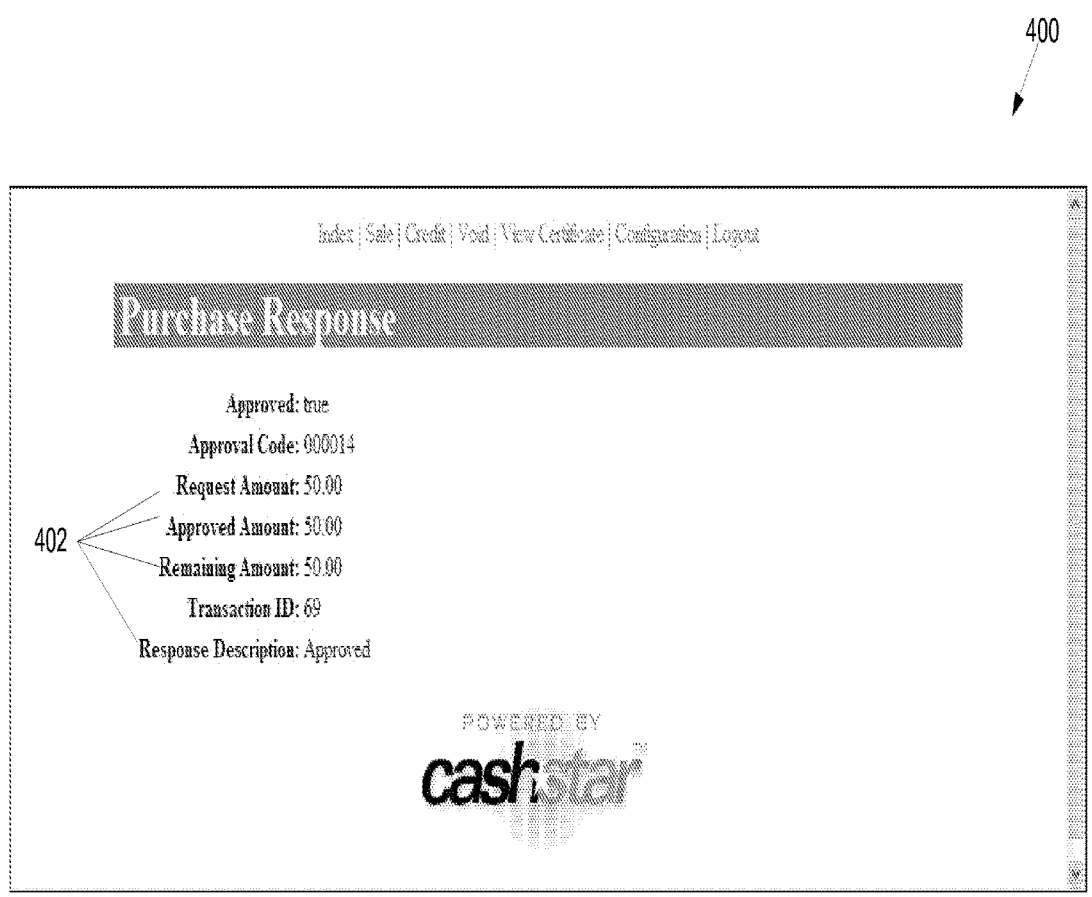
FIG. 7 illustrates a virtual gift card authorization browser application in accordance with one embodiment of the present invention, virtual gift cards by the processor model in accordance with one embodiment of the present invention.

According to one embodiment, the system may also provide an application, such as a browser application, that the retailer may use to authorize use of the gift card at any time after payment has been approved. As seen in FIG. 7, the browser application may include an interface 400 by which the retailer can authorize the use of a gift card. The interface 400 may include fields 402 which display authorization information related to the gift card. The authorization information fields 402 may include such information as the amount requested, the amount approved, the remaining amount on the card, and/or the determination of whether the card has been approved. In one embodiment, the application is secured using Secure Sockets Layers (SSL), a username/password requirement and/or the Internet Protocol (IF) address. Some examples and embodiments of the systems and methods that may be implemented according to the systems and methods described herein may be found in U.S. patent application Ser. No. 11/946,748, entitled PRE-PAID PAYMENT INSTRUMENT PROCESSING, which is herein incorporated by reference in its entirety.

According to some embodiments, the provider of the virtual gift card service can provide reporting, based upon the virtual gift card database, to the recipient, to the retailer, or both. For example, the provider can provide reporting of redemption statistics in real-time or over selected periods of time. The provider may also provide lift data indicating any increase in spending for the retailer's goods and/or services that can be attributed to the virtual gift card program over any time period. The provider may provide recency data showing a history of the most recent transactions (including purchase and/or redemption of virtual gift cards) over any time period. The provider can provide any other desired reporting that can be obtained from its database in which the times, amounts, and other data about virtual gift card purchase and redemption transactions are stored. According to one embodiment, reporting may be delivered by the provider through a webpage or browser application.

Figure 8:
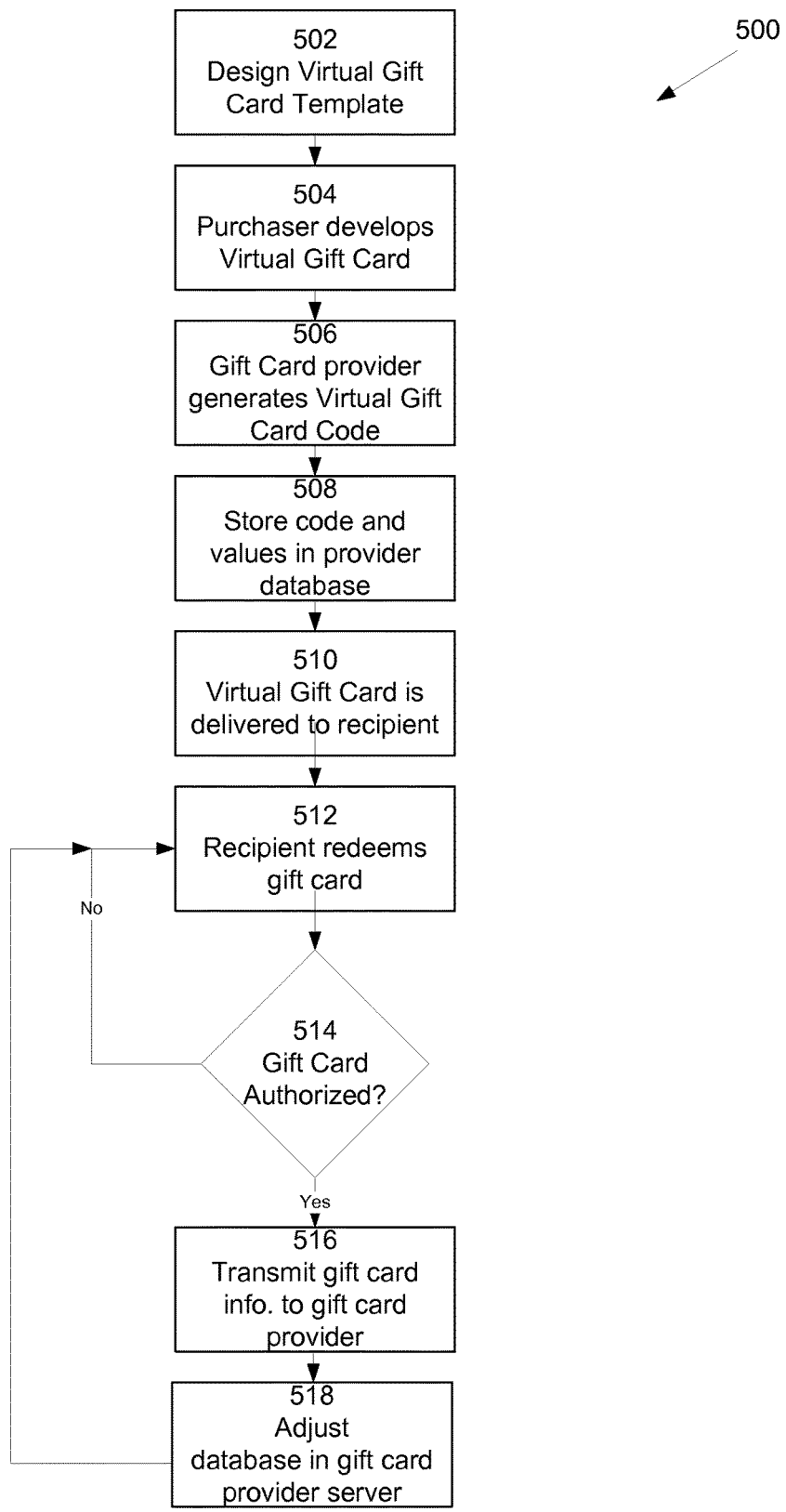

The development and administration of a virtual gift card by the processor model in accordance with one embodiment of the current invention will now be described in relation to the flow diagram 500 of FIG. 8. At block 502, the retailer designs (or has designed on its behalf) a virtual gift card template to be used by the gift card provider. As discussed above, the virtual gift card template may include design elements consistent with the retailer's branding, such as a logo or other images, particular colors and/or typefaces associated with the retailer's trade dress, or any other design element desired by the retailer. According to one embodiment, the virtual gift card template is stored on a server of the gift card provider. The development of the virtual gift card template will be described in greater detail below.

At block 504, a purchaser of a virtual gift card uses the virtual gift card template to develop a virtual gift card. The purchaser may be linked to the virtual gift card template on the gift card provider's server by clicking on a link on the retailer's website. However, in another embodiment, the purchaser may access the virtual gift card template on the gift card provider's server directly through a self service kiosk. In one embodiment, the self service kiosk is located in the retailer's store. While developing the virtual gift card, the purchaser may associate the virtual gift card with such information as a recipient's name, recipient's email and/or the value of the virtual gift card. In one embodiment, the purchaser may also associate the virtual gift card with an encrypted Personal Identification Number (PIN) which is required to redeem the virtual gift card.

At block 506, the virtual gift card system on the gift card provider's server, generates a unique virtual gift card code for the virtual gift card as discussed above. In one embodiment, the virtual gift card code is a 16-digit identification number. In another embodiment, the virtual gift card code may be displayed on the virtual gift card as a 16-bit alphanumeric number or a ID or 2D barcode. As discussed above, the virtual gift card code may be generated at any time—during the development of the virtual gift card.

At block 508, the virtual gift card code and monetary value associated with the virtual gift card are stored in a database on the gift card provider's server. At block 510, the virtual gift card is delivered to the intended recipient. In one embodiment, the virtual gift card is delivered via email as discussed above. According to another embodiment, the date on which the virtual gift card is delivered to the recipient may be pre-determined by the purchaser.

At block 512, the recipient of the virtual gift card may attempt to redeem the gift card. As discussed above, in one embodiment, the virtual gift card may be redeemed online or in the retailer's store. Depending on whether the recipient redeems the gift card online or in the store, the virtual gift card code may either be entered manually or scanned via the bar code.

After the virtual gift card code is processed, at block 514 the retailer may use a browser application, as discussed above, to authorize or deny the use of the gift card. According to one embodiment, the use of the gift card will be authorized if the remaining balance on the card is adequate to cover the purchase price and denied otherwise. After the use of the virtual gift card is authorized, at block 516, information such as the virtual gift card code and the purchase amount is communicated to the gift card provider. At block 518, based on the information received from the retailer, the gift card provider adjusts information related to the virtual gift card code, such as the remaining balance. Also at block 518, the gift card provider may store information in its database which may later be used by the retailer to generate statistics.

Figure 9:
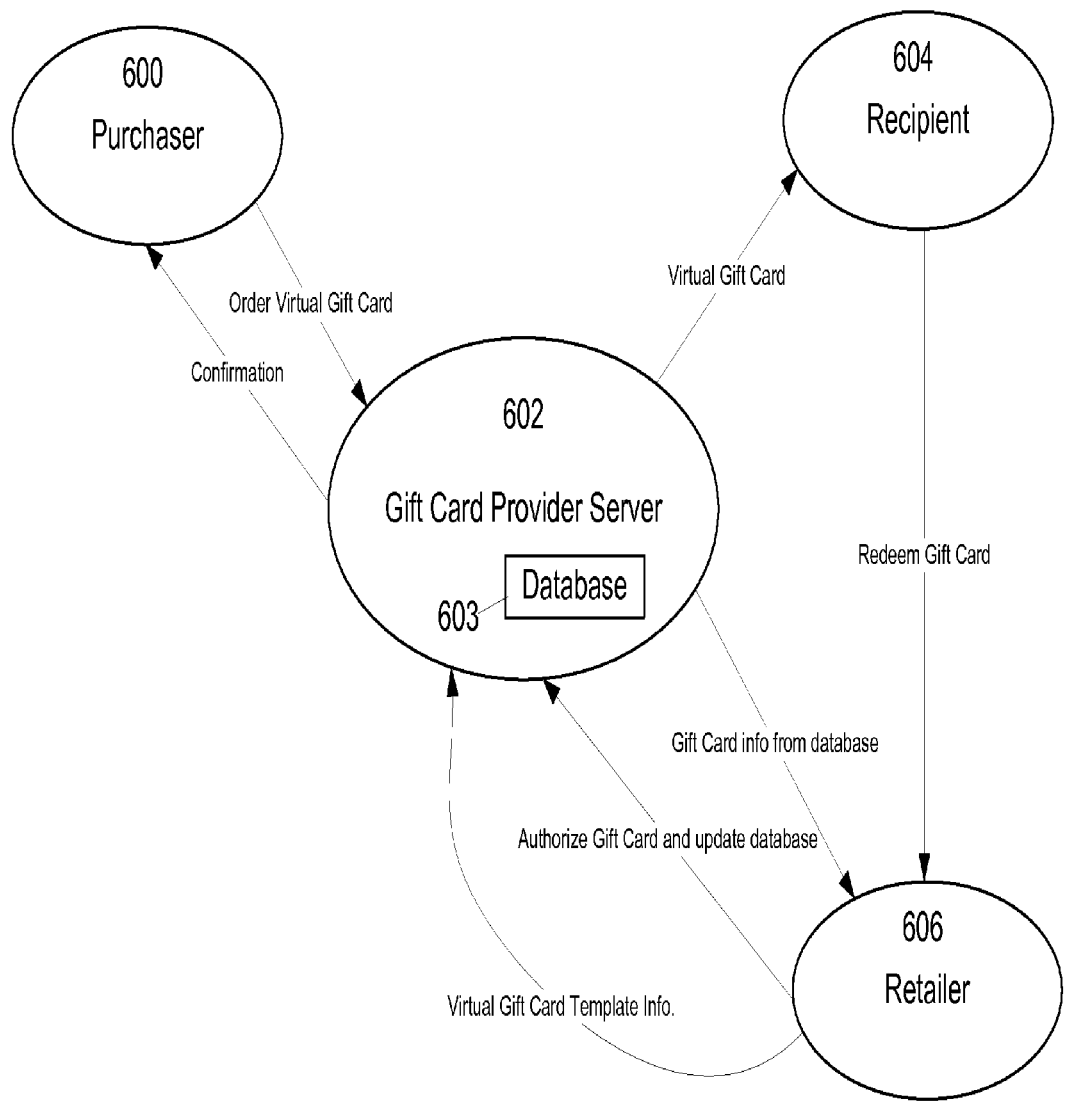
FIG. 9 is a block diagram of an example system architecture for developing and administering virtual gift cards by the processor model in accordance with one embodiment of the present invention.

The system architecture of a system capable of developing and administering virtual gift cards by the processor model in accordance with one embodiment of the present invention will now be described in relation to FIG. 9. The retailer 606 provides information to the gift card provider 602 to produce a virtual gift card template. A purchaser 600 sends information to the virtual gift card provider server 602 to order a virtual gift card. According to one embodiment, information may be sent to the gift card server 602 over the internet. The virtual gift card server 602 generates a virtual gift card and saves information related to the virtual gift card (i.e. the purchased value and the virtual gift card code) in the database 603 on the server 602. The server 602 sends a confirmation to the purchaser 600. The server 602 also sends the virtual gift card, or at least an email linking to the virtual gift card, to the recipient 604. The recipient 604 is able to, redeem the virtual gift card with the retailer 606. According to one embodiment, the recipient 604 may either redeem the gift card online at the retailer's website or in the retailer's store. After entering or scanning in the virtual gift card code from the virtual—gift card, the retailer 606 receives information about the virtual gift card (i.e. the available balance on the gift card) from the database 603 in the server 602. The retailer 606 may then either authorize or deny usage of the virtual gift card. According to one embodiment, the retailer 606 may authorize the use of a virtual gift card through the use of a browser application as discussed above. In response to the virtual gift card being authorized, updated information such as the updated gift card balance is sent back to the server 602 from the retailer 606 to update the database 603.

Distributor Model

One difference between embodiments structured according to the processor model and those structured according to the distributor model is that in the distributor model, the virtual gift card codes are provided by the retailer (or by a third-party providing virtual gift card codes on behalf of the retailer) instead of being generated by the virtual gift card provider.

The virtual gift card codes may be provided to the virtual gift card provider in a variety of ways. In one embodiment, a block of virtual gift card codes may be stored in a database of the provider for issue (i.e., assignment to a particular virtual gift card) upon sale of a virtual gift card. In such embodiments, the retailer may generate a block of such virtual gift card codes itself and provide them to the virtual gift card provider, or obtain them from a third party. In the latter case the retailer may receive a block of codes from the third party and pass them to the virtual gift card provider or instruct the third party to provide the codes directly to the virtual gift card provider.

In other embodiments, the virtual gift card codes may be provided to the provider one at a time, when needed. For example, the provider can obtain one or more virtual gift card codes as-needed during the process of generating a virtual gift card via a system call that requests a virtual gift card code (or any needed number of virtual gift card codes) from the retailer or from the third-party providing codes on behalf of the retailer.

Additionally, in embodiments of the distributor model, rather than the provider maintaining a database of virtual gift cards, the retailer maintains its own database of recipient accounts (or, a third party maintains such a database on behalf of the retailer). In such embodiments, there may be no need to update the provider when a virtual gift card is redeemed or partially redeemed. Accordingly the provider may not be involved in any aspect of transactions involving the virtual gift card after the virtual gift card is purchased and delivered.

Apart from such back-end implementation details, however, a virtual gift card system according to the distributor model may appear substantially the same to purchasers and recipients of virtual gift cards. Thus, according to one embodiment, the distributor model system can operate almost exactly as described above in connection with the processor model. The interfaces and features made available to the purchaser as described above in relation to the processor model may be implemented in embodiments of the distributor model as well. However, according to one embodiment in which the retailer operates its own recipient account database, the provider may not provide virtual gift card use data or statistics, and the recipient will not be able to view its redemption history, monitor balance information, or print out new virtual gift cards by viewing a webpage generated by the provider.

Figure 10:
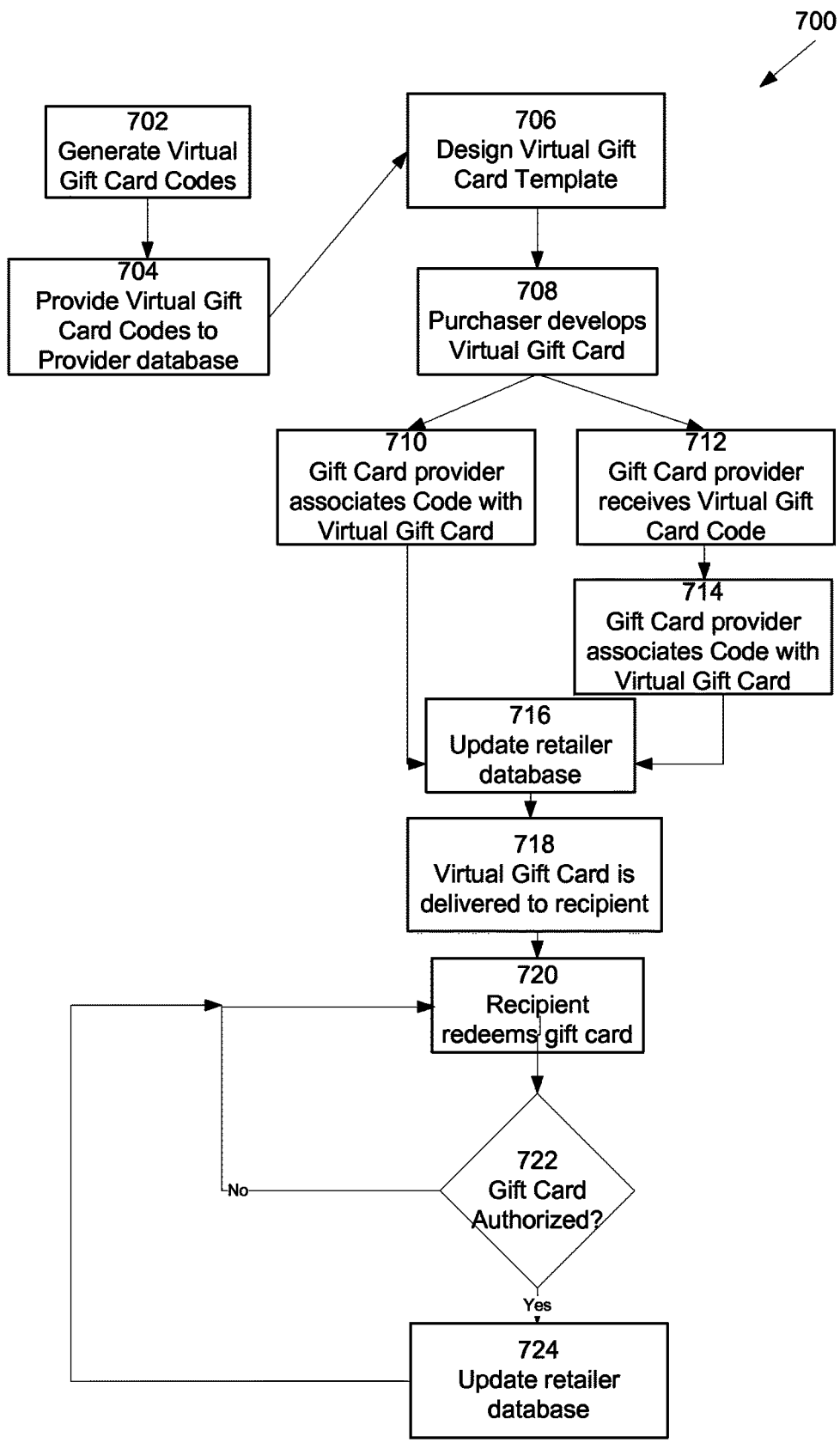
FIG. 10 is a flow diagram of an example process for developing and administering virtual gift cards by the distributor model in accordance with one embodiment of the present invention.

The development and administration of a virtual gift card by the distributor model in accordance with one embodiment of the current invention will now be described in relation to the flow diagram 700 of FIG. 10. At block 702, the retailer, or third party on behalf of the retailer, generates virtual gift card codes (as described above). At block 704, the generated virtual gift card codes are transmitted to the gift card provided and stored in a database. As discussed below, blocks 702 and 704 are optional and may be replaced by additionally optional blocks 712 and 714.

At block 706, the retailer designs (or has designed on its behalf) a virtual gift card template. As discussed above, the virtual gift card template may include design elements consistent with the retailer's branding, such as a logo or other images, particular colors and/or typefaces associated with the retailer's trade dress, or any other design element desired by the retailer. According to one embodiment, the virtual gift card template is stored on a server of the gift card provider. The development of the virtual gift card template will be described in greater detail below.

At block 708, a purchaser of a virtual gift card uses the virtual gift card template to develop a virtual gift card. The purchaser may be linked to the virtual gift card template on the gift card provider's server by clicking on a link on the retailer's website. However, in another embodiment, the purchaser may access the virtual gift card template on the gift card provider's server directly through a self service kiosk. In one embodiment, the self service kiosk is located in the retailer's store. While developing—the virtual gift card, the purchaser may associate the virtual gift card with such information as a recipient's name, recipient's email and/or the value of the virtual gift card. In one embodiment, the purchaser may also associate the virtual gift card with an encrypted Personal Identification Number (PIN) which is required to redeem the virtual gift card.

At block 710, in response to the virtual gift card codes being previously generated and stored in the provider's database in blocks 702 and 704, the virtual gift card provider associates one of the gift card codes with the virtual gift card. Alternatively, as discussed above, blocks 702 and 704 may be optional. If the gift card codes were not previously generated, at block 712 the gift card provider requests and subsequently receives a virtual gift card code from the retailer. At block 714, the virtual gift card provider associates the received gift card code with the virtual gift card.

At block 716, the virtual gift card information (i.e. the virtual gift card codes, recipient information and purchase amount) are updated in the recipient database maintained by the retailer. This is different than in the processor model in which such information is stored in a database in a virtual gift card provider database.

At block 718, the virtual gift card is delivered to the intended recipient. In one embodiment, the virtual gift card is delivered via email as discussed above. According to another embodiment, the date on which the virtual gift card is delivered to the recipient may be pre-determined by the purchaser.

At block 720, the recipient of the virtual gift card may attempt to redeem the gift card. As discussed above, in one embodiment, the virtual gift card may be redeemed online or in the retailer's store. Depending on whether the recipient redeems the gift card online or in the store, the virtual gift card code may either be entered manually or scanned via the bar code.

After the virtual gift card code is processed, at block 722 the retailer may use a browser application, as discussed above, to authorize or deny the use of the gift card. According to one embodiment, the use of the gift card will be authorized if the remaining balance on the card is adequate to cover the purchase price and denied otherwise. In response to the virtual gift card being authorized, at block 724 the information saved in the retailer's recipient database (i.e. remaining balance) is updated.

Figure 11:
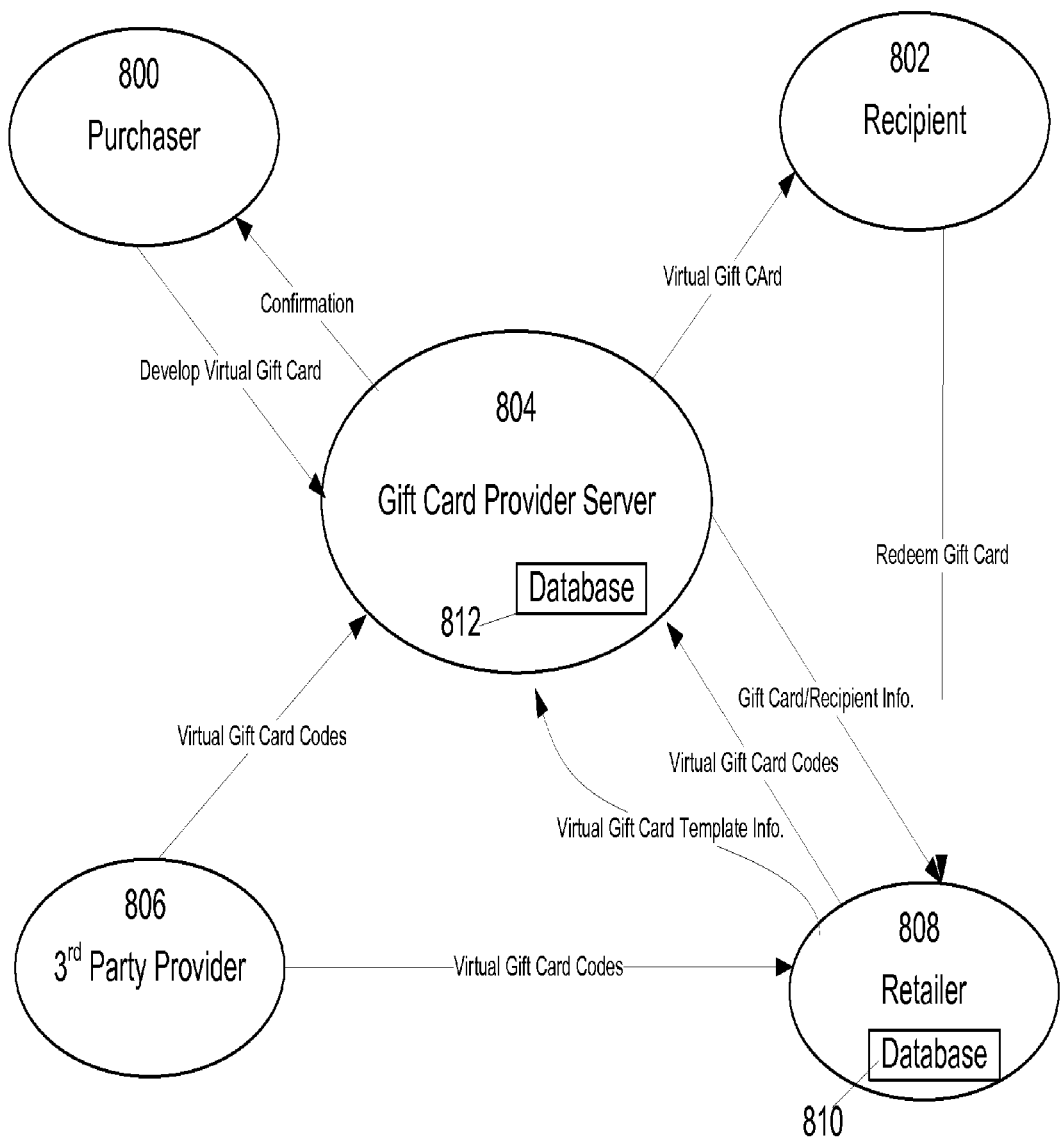
FIG. 11 is a block diagram of an example system architecture for developing and administering virtual gift cards by the distributor model in accordance with one embodiment of the present invention.

The system architecture of a system capable of developing and administering virtual gift cards by the distributor model in accordance with one embodiment of the present invention will now be described in relation to FIG. 11. The retailer 808 provides information to the gift card provider 804 to produce a virtual gift card template. The retailer 808 may also send virtual gift card codes to the virtual gift card provider 804. The virtual gift card codes may be stored in a database 812. As discussed above, the virtual gift card codes may also either be directly provided to the gift card provider 804 by a third party 806 or provided to the gift card provider 804 by a third party 806 via the retailer 808.

A purchaser 800 sends information to the virtual gift card provider 804 to develop a virtual gift card. According to one embodiment, information may be sent to the gift card server 804 over the internet. The virtual gift card provider 804 generates a virtual gift card and associates the virtual gift card with one of the virtual gift card codes. The virtual gift card information (i.e. the purchased value and the virtual gift card code) may be saved in the retailer's database 810.

The provider 804 sends a confirmation to the purchaser 800. The provider 804 also sends the virtual gift card, or at least an email linking to the virtual gift card, to the recipient 802. The recipient 802 is able to redeem the virtual gift card with the retailer 808. According to one embodiment, the recipient 802 may either redeem the gift card online at the retailer website or in the retailer's store. After entering or scanning in the virtual gift card code from the virtual gift card, the retailer 808 checks the database 810 for information about the virtual gift card (i.e. the available balance on the gift card). As such, unlike in the processor model, it is unnecessary to communicate with the gift card provider when redeeming the virtual gift card. The retailer 808 may then either authorize or deny usage of the virtual gift card. According to one embodiment, the retailer 808 may authorize the use of a virtual gift card through the use of a browser application as discussed above. In response to the virtual gift card being authorized, the database 810 is updated with current virtual gift card information (i.e. remaining balance).

Bulk Purchase System

At times it may be desirable to purchase multiple virtual gift cards simultaneously. For example, an employer wishing to purchase a gift card for everyone of his employees may find it convenient to configure and pay for multiple gift cards in a single interface, rather than stepping through the entire configuration and payment process repeatedly. For this reason, a system for providing a virtual gift card may include an interface for configuring multiple gift cards at once. The purchaser may access such a bulk purchase interface by selecting an option within the virtual gift card purchase interface.

Figure 12:
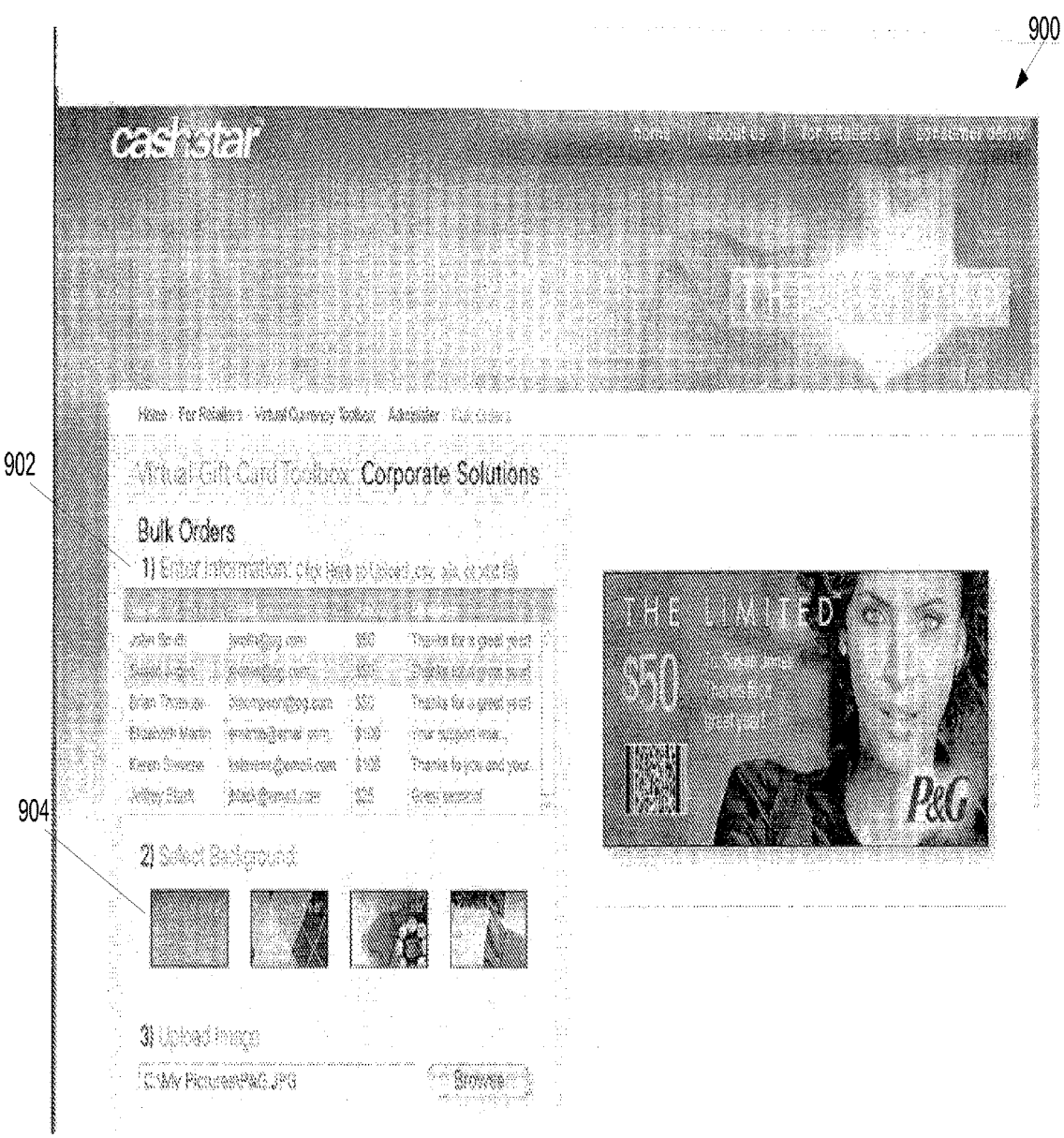
FIG. 12 illustrates a bulk purchase interface in accordance with one embodiment of the present invention.

According to one embodiment of a bulk purchase interface, as seen in FIG. 12, the interface 900 may include fields 902 in which the purchaser can enter denominations, recipient information, and/or customized messages for virtual gift cards any number of recipients. For example, the purchaser may select (or upload) a background image 904 that will be used for all the bulk-purchased virtual gift cards and then enter denominations, recipient information, and/or customized messages for a plurality of recipients. In one embodiment, the purchaser may be given the option to specify the same denomination and/or the same customized message for a plurality of recipients. In further embodiments, the interface 900 may allow the purchaser to upload a text file, spreadsheet file, or similar file containing denominations, recipient information, and/or customized messages for any number of recipients, instead of entering such information by hand into the interface 900. In such embodiments the system may specify one or more acceptable file formats (i.e. comma-delimited text).

Once the purchaser has submitted information specifying the virtual gift card parameters for all of the bulk virtual gift card recipients, the purchaser can proceed to the payment interface as described above. The virtual gift card provider's system may generate and assign a unique virtual gift card code to each of the specified recipients (in a system according to the processor model) or assign from a database a unique virtual gift card code to each of the specified recipients (in a system according to the distributor model).

Once the bulk purchase is complete, the virtual gift cards generated for the multiple recipients may be handled individually as described above. For example, the virtual gift card provider's system may send an email to each virtual gift card recipient, the email including the corresponding virtual gift card code as assigned above. Each recipient may redeem his or her own virtual gift card in any of the ways described above, including by shopping on-line with his or her virtual gift card code, and/or bringing to a physical store location a printout of the email or of a webpage containing the virtual gift card in alphanumeric and/or bar code form. In one embodiment, each individual recipient of a virtual gift card created as part of a bulk purchase can have access to dynamically updated information, as described above. Any other tracking or reporting that is possible for any virtual gift card system can also be implemented for virtual gift cards purchased in bulk.

Additionally, according to one embodiment, the purchaser of the bulk purchase of virtual gift cards may be provided, for example though a purchaser account at the provider's website, statistics relating to the bulk purchase. For example, the provider may provide access to data as to which or how many recipients have received, viewed, and/or used their virtual gift cards. Such data may be updated in real-time and dynamically accessed when the purchaser requests a report.

Virtual Gift Card Template System

Also provided in embodiments of the systems and methods described herein is a readily customizable system of on-line tools that the retailer can use to set up, configure, re-configure, and monitor a virtual gift card program. Instead of engaging an in-house or third party developer to develop tools for administering a virtual gift card program, a retailer can visit a provider's website and use the tools provided to quickly and easily set up a virtual gift card template with as much branding, as much specificity, and as many options for the purchaser as the retailer wishes. As described further below, the retailer can, in embodiments, have access to monitoring and analysis tools for studying sales and redemption data in real-time.

According to one embodiment, the virtual gift card provider may provide the retailer with an application that the retailer may use to design a template for virtual gift cards associated with the retailer. The application permits the retailer to specify one or more configurations of design elements of the virtual gift card. The application may be, for example, a browser application or a stand-alone application that runs on a computer of the retailer and sends the retailer-customized templates to the provider for use in providing virtual gift cards. An advantage of this feature is that the retailer can control aspects of the appearance of the virtual gift card, allowing the retailer to preserve its branding features (such as logo, typeface, design palate, &c.) even in virtual gift cards generated by the provider.

In one embodiment, the application presents an interface to a designer acting on behalf of the retailer that the designer may use to specify design elements of the retailer's virtual gift cards. For example, the interface may permit the designer to specify one or more background images for the virtual gift cards, the size, color, and placement of any text elements on the virtual gift card, or any other design feature. The interface may offer the designer a preview of the virtual gift card template either in real time or in response to a request from the designer.

Once the virtual gift card template is completed, it can be implemented by the virtual gift card provider. The virtual gift card template may be presented to a virtual gift card purchaser through an interface such as those described above, where the purchaser can provide any remaining information needed or desired to complete the virtual gift card. The design template application may include fields allowing the designer to specify which elements of the design are fixed within the template and which are subject to further customization by a virtual gift card purchaser.

In at least one embodiment, at least some design elements of the template may be specified by the designer such that a purchaser using an interface to purchase a virtual gift card may not be given the option to customize the design elements further. For example, the designer may specify that a logo of the retailer appear in a particular position on the virtual gift card, such that the purchaser does not have the option to remove the logo or move it to a different position on the gift card. As another example, the designer may specify that text on the virtual gift card appear in a particular size or particular color, such as a color associated with the retailer's trade dress.

In one embodiment, at least some design elements of the template may be specified with the designer such that additional specification is left to a purchaser of a virtual gift card. For example, a designer may provide any number of background images that are stored in the template. These background images may be presented to the purchaser in the purchase interface so that the purchaser may select one for the virtual gift card. As another example, the designer may specify in the template that text on the virtual gift card appear in a particular color, but leave to the purchaser the exact content of the text, such as the recipient's name and/or a personalized message provided to the recipient. As another example, the designer may specify the location of text, such as the recipient's name, on the virtual gift card, but permit the purchaser to select the color and the content of the text.

In one embodiment, after a virtual gift card template has been established and stored, a designer can edit the template at any time via the design template application. In another embodiment the design template is stored in a database of the virtual gift card provider and can be updated at any time via the design template application. Updates to the design template may take effect immediately, and be reflected the next time the design template is accessed by a purchaser.

Computer System

Various aspects and functions described herein in accord with the present invention may be implemented as hardware or software on one or more computer systems. There are many examples of computer systems currently in use that may be suitable for implementing various aspects of the present invention. Some examples include, among others, network appliances, personal computers, workstations, mainframes, networked clients, servers, media servers, application servers, database servers and web servers. Other examples of computer systems may include mobile computing devices, such as cellular phones and personal digital assistants, network equipment, devices involved in commerce such as point of sale equipment and systems, such as handheld scanners, magnetic stripe readers, bar code scanners and their associated computer systems, among others. Additionally, aspects in accord with the present invention may be located on a single computer system or may be distributed among a plurality of computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system elements and components using a variety of hardware and software configurations, and the invention is not limited to any particular distributed architecture, network, or communication protocol.

Figure 13:
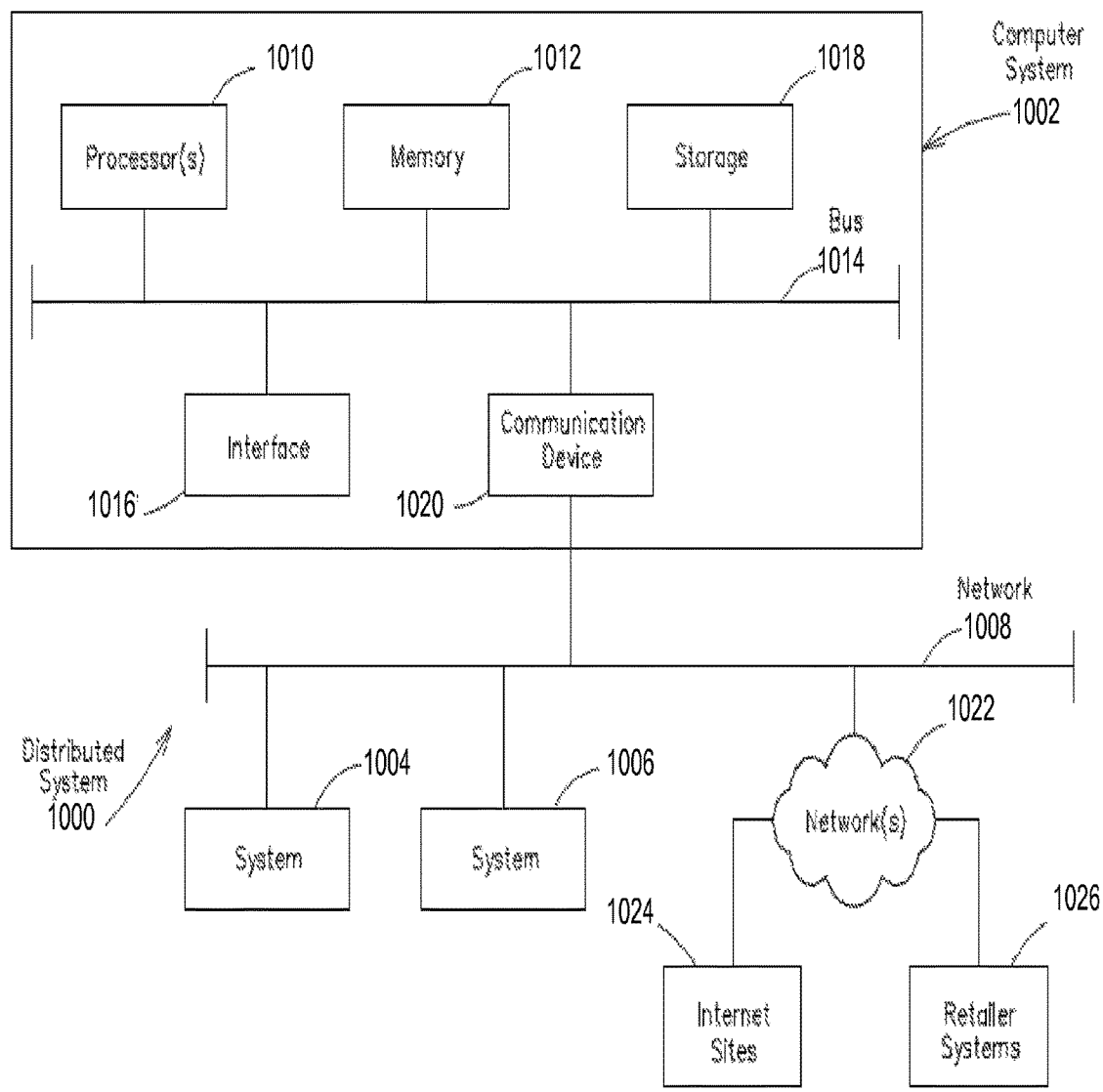
FIG. 13 illustrates an example computer system in which various aspects in accordance with the present invention may be implemented.

FIG. 13 shows a block diagram of a distributed computer system 1000, in which various aspects and functions in accord with the present invention may be practiced. The distributed computer system 1000 may include one more computer systems. For example, as illustrated, the distributed computer system 1000 includes three computer systems 1002, 1004 and 1006, but distributed computer system 1000 could include any number of systems. As shown, the computer systems 1002, 1004 and 1006 are interconnected by, and may exchange data through, a communication network 1008. Network 1008 may include any communication network through which computer systems may exchange data. To exchange data via network 1008, the computer systems 1002, 1004 and 1006 and the network 1008 may use various methods, protocols and standards including, among others, Ethernet, Wi-Fi, Bluetooth, TCP/IP, 5 UDP, HTTP, FTP, SNMP, SMS, MMS, SS7, JSON, XML, REST, SOAP, RMI, DCOM and/or Web Services. To ensure data transfer is secure, the computer systems 1002, 1004 and 1006 may transmit data via the network 1008 using a variety of security measures including TSL, SSL or VPN, among other security techniques. While the distributed computer system 1000 illustrates three networked computer systems, the distributed computer system 1000 may include any 10 number of computer systems, networked using any medium and communication protocol or combination thereof.

Various aspects and functions in accord with the present invention may be implemented as specialized hardware 01' software executing in one 01' more computer systems including a computer system 1002 shown in FIG. 13. As depicted, the computer system 1002 includes a processor 1010, a memory 1012, a bus 1014 or other internal communication system, an interface 1016, a storage system 1018 and a communication device 1020. Processor 1010, which may include one or more microprocessors or other types of controllers, can perform a series of instructions that result in manipulated data. Processor 1010 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available. As shown, processor 1010 may be connected to other system elements, including a memory 1012, by bus 1014.

Memory 1012 may be used for storing programs and data during operation of the computer system 1002. Thus, memory 1012 may be a relatively high performance, volatile, random access memory such as a dynamic random access memory (DRAM) 01' static memory (SRAM). However, memory 1012 may include any device for storing data, such as a disk drive or other non-volatile storage device. Various embodiments in accord with the present invention can organize memory 1012 into particularized and, in some cases, unique structures to perform the aspects and functions disclosed herein.

Components of computer system 1002 may be coupled by an interconnection element such as bus 1014. Bus 1014 may include one or more physical busses (for example, busses between components that are integrated within a same machine), but may include any communication coupling between system elements including specialized or standard computing bus technologies such as IDE, SCSI, PCI and InfiniBand. Thus, bus 1014 may enable communications (for example, data and instructions) to be exchanged between system components of the computer system 1002.

The computer system 1002 also includes one or more interface devices 1016 such as input devices, output devices and combination input/output devices. Interface devices 1016 may receive input or provide output. More particularly, output devices may render information for external presentation. Input devices may accept information from external sources. Examples of interface devices include, among others, keyboards, bar code scanners, mouse devices, trackballs, magnetic strip readers, microphones, touch screens, printing devices, display screens, speakers, network interface cards, etc. The interface devices 1016 allow the computer system 1002 to exchange information and communicate with external entities, such as users and other systems.

Storage system 1018 may include a computer readable and writeable nonvolatile storage medium in which instructions are stored that define a program to be executed by the processor. Storage system 1018 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, processor 1010 or some other controller may cause data to be read from the nonvolatile recording medium into another memory, such as the memory 1012, that allows for faster access to the information by the processor than does the storage medium included in the storage system 1018. The memory may be located in storage system 1018 or in memory 1012. Processor 1010 may manipulate the data within memory 1012, and then copy the data to the medium associated with the storage system 1018 after processing is completed. A variety of components may manage data movement between the medium and integrated circuit memory element and the invention is not limited thereto. Further, the invention is not limited to a particular memory system or storage system.

Although computer system 1002 is shown by way of example as one type of computer system upon which various aspects and functions in accord with the present invention may be practiced, aspects of the invention are not limited to being implemented on the computer system as shown in FIG. 13. Various aspects and functions in accord with the present invention may be practiced on one or more computers having a different architectures or components than that shown in FIG. 13. For instance, computer system 1002 may include specially-programmed, special-purpose hardware, such as for example, an application-specific integrated circuit (ASIC) tailored to perform a particular operation disclosed herein. While another embodiment may perform the same function using several general-purpose computing devices running MAC as System X with Motorola PowerPC processors and several specialized computing devices running proprietary hardware and operating systems.

Computer system 1002 may include an operating system that manages at least a portion of the hardware elements included in computer system 1002. A processor or controller, such as processor 1010, may execute an operating system which may be, among others, a Windows-based operating system (for example, Windows NT, Windows 2000 (Windows ME), Windows XP, or Windows Vista) available from the Microsoft Corporation, a MAC as System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various aspects and functions in accord with the present invention may be implemented in a non-programmed environment (for example, documents created in HTML, XML or other format that, when viewed in a window of a browser program, render aspects of a graphical-user interface or perform other functions). Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used.

A computer system included within an embodiment may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from Sun Microsystems of Santa Clara, Calif. or integration software such as Web Sphere middleware from IBM of Armonk, N.Y.

Other elements of the virtual gift card management system may include other types of well-known systems such as credit card processing systems such as those available commercially from Hypercom, Verifone, Nurit, and other providers. Various systems of the virtual gift card management system may integrate with other types of payment systems, such as debit card processing systems, check card readers, PC-based payment terminal systems, among others. For instance, various embodiments may be capable of working with one or more systems or components coupled through one or more communication networks (e.g., networks 1022). For example, the virtual gift card management system may integrate with, or be incorporated into, one or more Internet-based systems (e.g., Internet sites 1024), retailer systems (e.g., element 1026) or other computer-based systems that interact with gift card programs. According to one embodiment, these types of systems may be adapted to manage offers associated with gift cards. Some examples and embodiments of the systems and methods that may be implemented according to the systems and methods described herein may be implemented using systems similar to those described in U.S. patent application Ser. No. 11/946,748, entitled PRE-PAID PAYMENT INSTRUMENT PROCESSING incorporated herein by reference.

It should be understood that the invention is not limited to each of the embodiments described herein, but rather, various embodiments of the invention may be practiced alone or in combination with other embodiments.

What is claimed is:

1. A method of operating a virtual gift card provider server system operational on a distributed computer network for administering virtual gift cards on behalf of third-party retailers by providing a customizable virtual gift card template, the method comprising:

receiving, by a dedicated server of the virtual gift card provider server system over the distributed computer network from a retailer server system associated with a retailer entity distinct from the virtual gift card provider, a request to transmit a webpage interface configured to receive data for generating a virtual gift card template associated with the retailer entity, the request being generated by the retailer server system in response to an input from a user operating a computer application running on a computing terminal operated by the retailer entity;

transmitting, by the virtual gift card provider server system in response to receiving the request from the retailer server system, the webpage interface over the distributed computer network to the computing terminal, the webpage interface comprising data-input fields specified by the user which elements of the virtual gift card template are fixed within the template and which are subject to further customization by a virtual gift card purchaser, the data-input fields including a branding design logo specific to the retailer entity and provided by the retailer server system and typeface or text or other design feature associated with a trade dress of the retailer entity;

receiving, at the virtual gift card provider server system from the application, the virtual gift card template including the data-input fields specified by the user of the retailer server system, presenting, by the virtual gift card provider server system, the virtual gift card template as a customizable webpage interface to the virtual gift card purchaser operating a computing terminal distinct from the computing terminal operated by the retailer entity;

receiving, by the virtual gift card provider server system over the distributed computer network from the customizable webpage interface on the computing terminal operated by the virtual gift card purchaser, in response to input from the virtual gift card purchaser, a value and a recipient for the virtual gift card, the customizable webpage interface including a data-input field configured to receive a personalized message inputted by the virtual gift card purchaser;

responsive to receiving the value and the recipient, causing a virtual gift card account to be created, the account including a unique code, the value, and the recipient correlated to an encoded electronic representation of the virtual gift card; and transmitting, by the virtual gift card provider server system over the distributed computer network to a computing device of the recipient, an electronic message including the encoded electronic representation, the unique code for the virtual gift card, the branding design logo specific to the retailer entity, the typeface or text or other design feature associated with the trade dress of the retailer entity, and optionally the personalized message if entered by the virtual gift card purchaser.

2. The method of claim 1, further comprising:

receiving, from the computing device operated by the recipient, an electronic message including the unique code for the virtual gift card and an amount of a purchase; and debiting, by the virtual gift card provider server system from the virtual gift card account associated with the virtual gift card, the amount of the purchase.

3. The method of claim 1, further comprising:

receiving, by the virtual gift card provider server system from the computing terminal operated by the retailer entity, an electronic message including the unique code for the virtual gift card and an amount of a purchase; and debiting, by the virtual gift card provider server system from the virtual gift card account associated with the virtual gift card, the amount of the purchase.

4. The method of claim 1, further comprising receiving, by the virtual gift card provider server system from the webpage interface operating on the computing terminal of the purchaser, in response to input from the purchaser, information specifying at least one customizable design element, and wherein the electronic message sent to the designated recipient of the virtual gift card includes the at least one customizable design element specified by the purchaser.

5. The method of claim 4, wherein the webpage interface transmitted to the computing terminal operated by the purchaser further includes a preview portion displaying the at least one customizable design element according to the information specifying the at least one customizable design element.

6. The method of claim 1, further comprising generating a plurality of codes, each of the codes corresponding to one of a plurality of virtual gift cards, wherein the unique code for the virtual gift card is selected from the plurality of generated codes.

7. The method of claim 1, wherein the interface webpage provided to the computing terminal operated by the purchaser further comprises a plurality of branding design elements specific to the retailer entity associated with the virtual gift card.

8. The method of claim 1, wherein the webpage interface further comprises layout specific to the retailer entity associated with the virtual gift card.

9. A host computer server system for facilitating electronic-based interactions between a computing device of a user and a third-party computer system of a third party over a distributed computer network by providing a customizable virtual gift card template, the host computer server system comprising:

one or more data storage modules;

one or more server processors communicatively coupled to the one or more data storage modules;

one or more communication devices communicatively coupling at leaset one of the one or more server processors with the computing device of the user and the third-party computer system via the distributed computer network, the user and the third party being distinct from a host of the host computer server system; and one or more memory devices communicatively coupled to the one or more server processors and storing processor-executable instructions which, when executed by at least one of the one or more server processors, cause the host computer server system to:

receive, from the third-party computer system over the distributed computer network, a request to transmit to the user computing device a webpage interface for generating a virtual gift card template associated with the third party, the request being transmitted in response to an input from a user operating a computer application running on a computing terminal operated by the third-party computer system;

transmit, over the distributed computer network in response to the request received from the third-party computer system, the webpage interface to the computing device operated by the user, the webpage interface including data-input fields specified by the user which elements of the virtual gift card template are fixed within the template and which are subject to further customization by a virtual gift card purchaser, the data-input fields including a branding design logo specific to the third party and provided by the third party computer system and typeface or text or other design feature associated with a trade dress of the third party;

receive from the application the virtual gift card template including the data-input fields specified by the user of the third party computer system;

present the virtual gift card template as a customizable webpage interface to the virtual gift card purchaser operating a computing terminal distinct from the computing device operated by the user;

receive, from the customizable webpage interface operating on the computing terminal operated by the virtual gift card purchaser, in response to input from the virtual gift card purchaser, a value and a designated recipient for the virtual gift card, the customizable webpage interface including a data-input filed configured to receive a personalized message inputted by the virtual gift card purchaser;

responsive to receiving the value and the recipient, cause a virtual gift card account to be created, the account including a unique code, the value, and the designated recipient correlated to an encoded electronic representation of the virtual gift card; and transmit, over the distributed computer network to a computing device of the designated recipient, to a computing device of the designated recipient, an electronic message including the encoded electronic representation, the unique code of the virtual gift card, the branding design logo specific to the retailer entity, the typeface or text or other design feature associated with the trade dress of the retailer entity, and optionally the personalized message if entered by the virtual gift card purchaser.

10. The host computer server system of claim 9, wherein the one or more memory devices store additional instructions which cause the host computer server system to generate a plurality of codes, each of the codes corresponding to one of a plurality of virtual gift cards, wherein the unique code for the virtual gift card is selected from the generated codes.

11. The host computer server system of claim 9, wherein the one or more memory devices store additional instructions which cause the host computer server system to receive the unique code for the virtual gift card from the third-party computer system.

12. The host computer server system of claim 9, wherein the one or more memory devices store additional instructions which cause the host computer server system to:
receive, from third-party computer system, a message including the code for the virtual gift card and an amount of a purchase made by the designated recipient; and debiting, from the stored virtual gift card account associated with the virtual gift card, the amount of the purchase.

13. The host computer server system of claim 9, wherein the one or more memory devices store additional instructions which cause the host computer server system to transmit a second interface to the computing device operated by the designated recipient, the second interface comprising a data-input field operable to receive a security confirmation input from the designated recipient.

14. The host computer server system of claim 9, wherein the storing the virtual gift card account includes associating the virtual gift card with an encrypted personal identification number.

15. The host computer server system of claim 9, wherein the webpage interface further comprises a layout specific to the third-party associated with the virtual gift card.

* * * * *